US010713596B2

(12) United States Patent
Cozine et al.

(10) Patent No.: US 10,713,596 B2
(45) Date of Patent: Jul. 14, 2020

(54) TRANSFORMING PROPERTY DATA INTO SUFFICIENTLY SIZED, RELATIVELY HOMOGENEOUS DATA SEGMENTS FOR CONFIGURING AUTOMATED MODELING SYSTEMS

(71) Applicant: INTELLIREAL, LLC, Lakewood, CO (US)

(72) Inventors: Carl Allan Cozine, Denver, CO (US); Bradley D. Brown, Litleton, CO (US); Eric L. Miles, Castle Rock, CO (US)

(73) Assignee: IntelliReal, LLC, Lakewood, CO (US)

( * ) Notice: Subject to any disclaimer, the term of this patent is extended or adjusted under 35 U.S.C. 154(b) by 386 days.

(21) Appl. No.: 15/854,400

(22) Filed: Dec. 26, 2017

(65) Prior Publication Data
US 2018/0225593 A1 Aug. 9, 2018

Related U.S. Application Data

(63) Continuation-in-part of application No. 12/121,477, filed on May 15, 2008, now abandoned.
(Continued)

(51) Int. Cl.
*G06N 20/00* (2019.01)
*G06Q 30/02* (2012.01)
(Continued)

(52) U.S. Cl.
CPC ............ *G06N 20/00* (2019.01); *G06F 16/29* (2019.01); *G06Q 30/02* (2013.01);
(Continued)

(58) Field of Classification Search
CPC .... G06N 20/00; G06Q 50/16; G06Q 30/0278; G06Q 30/0205; G06Q 30/02; G06Q 30/0206; G06F 16/29; G06F 16/258
See application file for complete search history.

(56) References Cited

U.S. PATENT DOCUMENTS 7,386,519 B1* 6/2008 Delurgio ................ G06Q 10/04
705/400
7,970,674 B2* 6/2011 Cheng .................... G06Q 10/10
705/35
(Continued)

OTHER PUBLICATIONS

A. Cechin, A. Souto and M. Aurelio Gonzalez, "Real estate value at Porto Alegre city using artificial neural networks," Proceedings. vol. 1. Sixth Brazilian Symposium on Neural Networks, Rio de Janeiro, RJ, Brazil, 2000, pp. 237-242. (Year: 2000).*
(Continued)

*Primary Examiner* — Carrie S Gilkey
(74) *Attorney, Agent, or Firm* — Kilpatrick Townsend & Stockton LLP

(57) ABSTRACT

Embodiments are described for transforming data relatively homogeneous data segments for training or otherwise configuring automated modeling systems. For example, a computing system selects, from standardized data, geographic data objects associated with a completed transaction value greater than the threshold number. The computing system clusters these geographic data objects and combines completed transactions associated with the selected geographic data objects into segments. The computing system performs a similarity analysis for pairs of the geographic data objects by comparing numerically valued attributes of the geographic data objects. The computing system also selects, from the standardized data, remaining completed transactions that are not grouped into segments and combines, based on the similarity analysis and the threshold number, these property transactions into segments such that each completed transaction has been assigned to one or more of the relatively homogeneous segments. The computing system trains an automated modeling algorithm with the relatively homogeneous segments.

20 Claims, 14 Drawing Sheets

Related U.S. Application Data

(60) Provisional application No. 60/917,948, filed on May 15, 2007.

(51) Int. Cl.
*G06F 16/29* (2019.01)
*G06Q 50/16* (2012.01)

(52) U.S. Cl.
CPC ..... *G06Q 30/0205* (2013.01); *G06Q 30/0206* (2013.01); *G06Q 30/0278* (2013.01); *G06Q 50/16* (2013.01)

(56) References Cited

U.S. PATENT DOCUMENTS

| | | | |
|---|---|---|---|
| 2001/0039506 A1* | 11/2001 | Robbins | G06Q 10/06 705/7.34 |
| 2002/0087389 A1* | 7/2002 | Sklarz | G06Q 30/02 705/7.34 |
| 2004/0153330 A1 | 8/2004 | Miller et al. | |
| 2006/0015357 A1 | 1/2006 | Cagan | |
| 2008/0288312 A1 | 11/2008 | Miles et al. | |
| 2008/0301064 A1* | 12/2008 | Burns | G06Q 30/0283 705/400 |

OTHER PUBLICATIONS

U.S. Appl. No. 12/121,477, Board Decision, mailed Oct. 27, 2017, 15 pages.
U.S. Appl. No. 12/121,477, Examiner's Answer, mailed Mar. 11, 2016, 18 pages.
U.S. Appl. No. 12/121,477, Final Office Action, dated May 28, 2015, 33 pages.
U.S. Appl. No. 12/121,477, Non Final Office Action, dated Dec. 27, 2013, 12 pages.
U.S. Appl. No. 12/121,477, Non-Final Office Action, dated Dec. 11, 2014, 24 pages.
U.S. Appl. No. 12/121,477, Office Action, dated 7, 2011, 12 pages.
U.S. Appl. No. 12/121,477, Office Action, dated Sep. 28, 2012, 12 pages.

\* cited by examiner

| Base Geographical Unit | Assigned to Segment | Scaled Attribute 1 | Scaled Attribute 2 | Transaction Count |
|---|---|---|---|---|
| A | 9 | 66.27178512 | 55.4825719 | 591 |
| B | 6 | 51.73765959 | 94.83386328 | 1106 |
| C | 5 | 30.23316237 | 87.02187814 | 687 |
| D | 7 | 4.491110597 | 53.77921553 | 462 |
| E | 3 | 51.82933671 | 55.11458082 | 1728 |
| F | 12 | 11.38387867 | 15.99730377 | 369 |
| G | 11 | 84.21892624 | 98.59392818 | 352 |
| H | 11 | 36.44323476 | 70.86546951 | 763 |
| I | 1 | 98.33784018 | 71.55044001 | 1974 |
| J | 8 | 94.52269542 | 9.468755905 | 1463 |
| K | 7 | 23.60989261 | 47.46681117 | 1195 |
| L | 11 | 76.32767336 | 81.20484765 | 341 |
| M | 2 | 69.17146896 | 77.339492 | 1752 |
| N | 12 | 66.60461211 | 35.59890912 | 1180 |
| O | 12 | 40.73296038 | 14.47249771 | 53 |
| P | 7 | 31.2378905 | 52.31857381 | 1497 |
| Q | 5 | 32.35794957 | 84.43366786 | 336 |
| R | 11 | 51.69907662 | 68.59662424 | 363 |
| S | 8 | 98.94107594 | 17.99897514 | 793 |
| T | 6 | 58.29463456 | 91.87751382 | 794 |
| U | 12 | 39.33096146 | 33.97853077 | 1046 |
| V | 10 | 67.83745367 | 16.82059704 | 1201 |
| W | 9 | 70.02445932 | 45.94511697 | 1197 |
| X | 10 | 81.21254989 | 24.18659867 | 1316 |
| Y | 4 | 63.84488041 | 26.52118906 | 1682 |
| Z | 5 | 30.86244218 | 81.10851253 | 503 |

526

| Base Geographical Unit | Transaction Count |
|---|---|
| I | 1974 |
| M | 1752 |
| E | 1728 |
| Y | 1682 |
| P | 1497 |
| J | 1463 |
| X | 1316 |
| V | 1201 |
| W | 1197 |
| K | 1195 |
| N | 1180 |
| B | 1106 |
| U | 1046 |
| T | 794 |
| S | 793 |
| H | 763 |
| C | 687 |
| A | 591 |
| Z | 503 |
| D | 462 |
| F | 369 |
| R | 363 |
| G | 352 |
| L | 341 |
| Q | 336 |
| O | 53 |

| BGU Pair 530 | Distance 590 |
|---|---|
| GT | 26.78020016 |
| DP | 26.78663304 |
| QT | 26.98374457 |
| OV | 27.2060127 |
| NU | 27.32174309 |
| AL | 27.61804407 |
| LR | 27.66830451 |
| JV | 27.67944536 |
| BL | 28.11438856 |
| EM | 28.190357 |
| CR | 28.28914025 |
| BH | 28.43243448 |
| CT | 28.47847292 |
| PZ | 28.79238672 |
| AY | 29.06288978 |
| RW | 29.13606755 |
| VW | 29.20651734 |
| EK | 29.23739739 |
| FO | 29.38866501 |

542 — (points to LR)
539 — (points to NU)
544 — (points to FO)

FIG. 5D

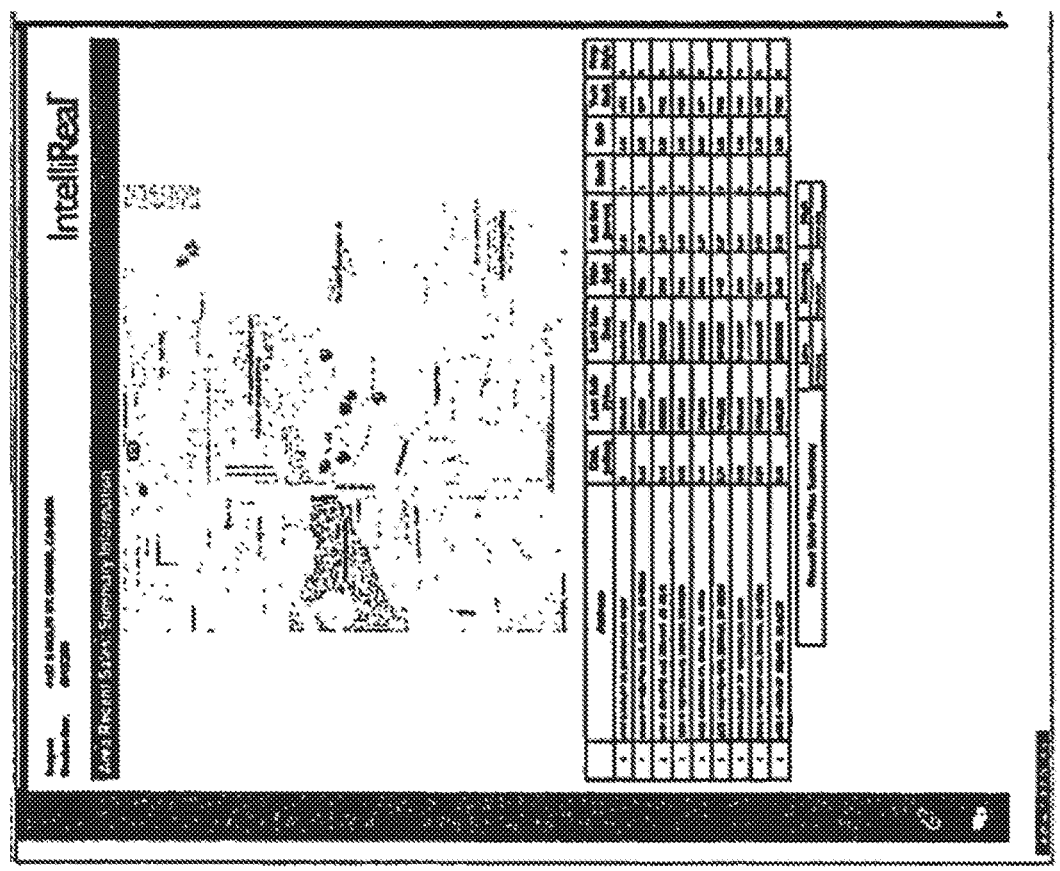
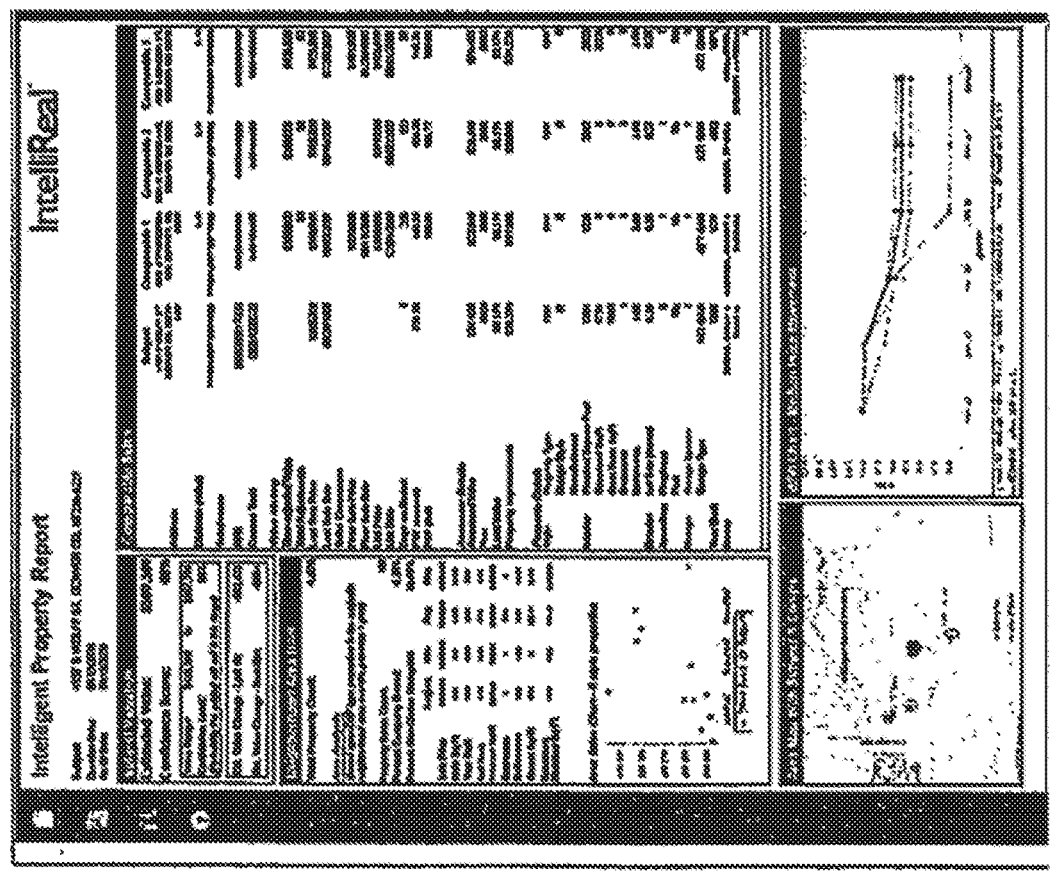
FIG. 7

TRANSFORMING PROPERTY DATA INTO SUFFICIENTLY SIZED, RELATIVELY HOMOGENEOUS DATA SEGMENTS FOR CONFIGURING AUTOMATED MODELING SYSTEMS

CROSS-REFERENCE TO RELATED APPLICATIONS

This disclosure is a continuation in part of, and claims priority to, U.S. patent application Ser. No. 12/121,477, filed May 15, 2008, and also claims priority to U.S. Provisional Patent Application No. 60/917,948, filed on May 15, 2007, the contents of both of which are hereby incorporated by reference.

TECHNICAL FIELD

This disclosure generally relates to digital data processing systems and methods for emulation of decision-making and other intelligence, and more particularly relates to transforming property data from disparate sources into sufficiently sized, relatively homogeneous data segments for training or otherwise configuring automated modeling systems.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright.

BACKGROUND

Automated modeling systems implement automated modeling algorithms that are trained using large volumes of training data. Automated modeling algorithms can use modeling techniques such as logistic regression, neural networks, etc. The training data for training automated modeling algorithms can be generated by or otherwise indicate certain electronic transactions or circumstances. In a training process, this training data is analyzed by one or more computing devices of an automated modeling system. The training data is grouped into attributes that are provided as inputs to the automated modeling system. The automated modeling system can use this analysis to learn from and make predictions regarding similar electronic transactions or circumstances. For example, the automated modeling system uses the attributes to learn how to generate predictive outputs involving transactions or other circumstances similar to the attributes from the training data.

In one example, automated modeling algorithms that predict real property values use training data involving properties that differ along numerous attributes, where these differences in attributes can impact the predictive output of the automated modeling algorithm. Data-segmentation operations can be used to transform raw data into training data segments based on differences or similarities in the raw data. The segmented data is used for training the automated modeling algorithm.

The accuracy with which an automated modeling algorithm learns to make predictions of future actions can depend on how the training data is segmented prior to training the automated modeling algorithm. But certain data-segmentation operations may decrease the accuracy with which an automated modeling algorithm generates predictive outputs or otherwise simulates decision-making processes. For instance, automated modeling algorithms involving real property data could be hindered by the large number of attributes relevant to the model. When very large numbers of categorically and numerically measured attributes are presented for data segmentation, existing techniques are unable to segment these types of training data in a manner that results in precise and accurate results.

SUMMARY

Embodiments are described for transforming raw property data into sufficiently sized, relatively homogeneous data segments that can be used for training or otherwise configuring automated modeling systems. For example, a computing system standardizes data retrieved from multiple data providers and selects, from the standardized data, geographic data objects associated with a completed transaction value greater than the threshold number. The computing system combines these geographic data objects into clusters and combines completed transactions associated with the selected geographic data objects into segments. The computing system performs a similarity analysis possible pairs of the geographic data objects by comparing numerically valued attributes associated with the geographic data objects. The computing system also selects, from the standardized data, remaining completed transactions that are not grouped into segments and combines, based on the similarity analysis and the threshold number, these remaining completed real property transactions into segments such that each completed transaction has been assigned to one or more of the relatively homogeneous segments. The computing system trains an automated modeling algorithm to predict an exchange attribute value.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 5B depicts a list of geographic identifier sorted in descending order by transaction count, according to certain embodiments.

FIG. 5D depicts another portion of the partial list of geographic identifier pairs sorted in ascending order by a similarity function, according to certain embodiments.

FIG. 7 is an Intelligent Property Report computed for a target property record, according to certain embodiments.

DETAILED DESCRIPTION

Figure 1:
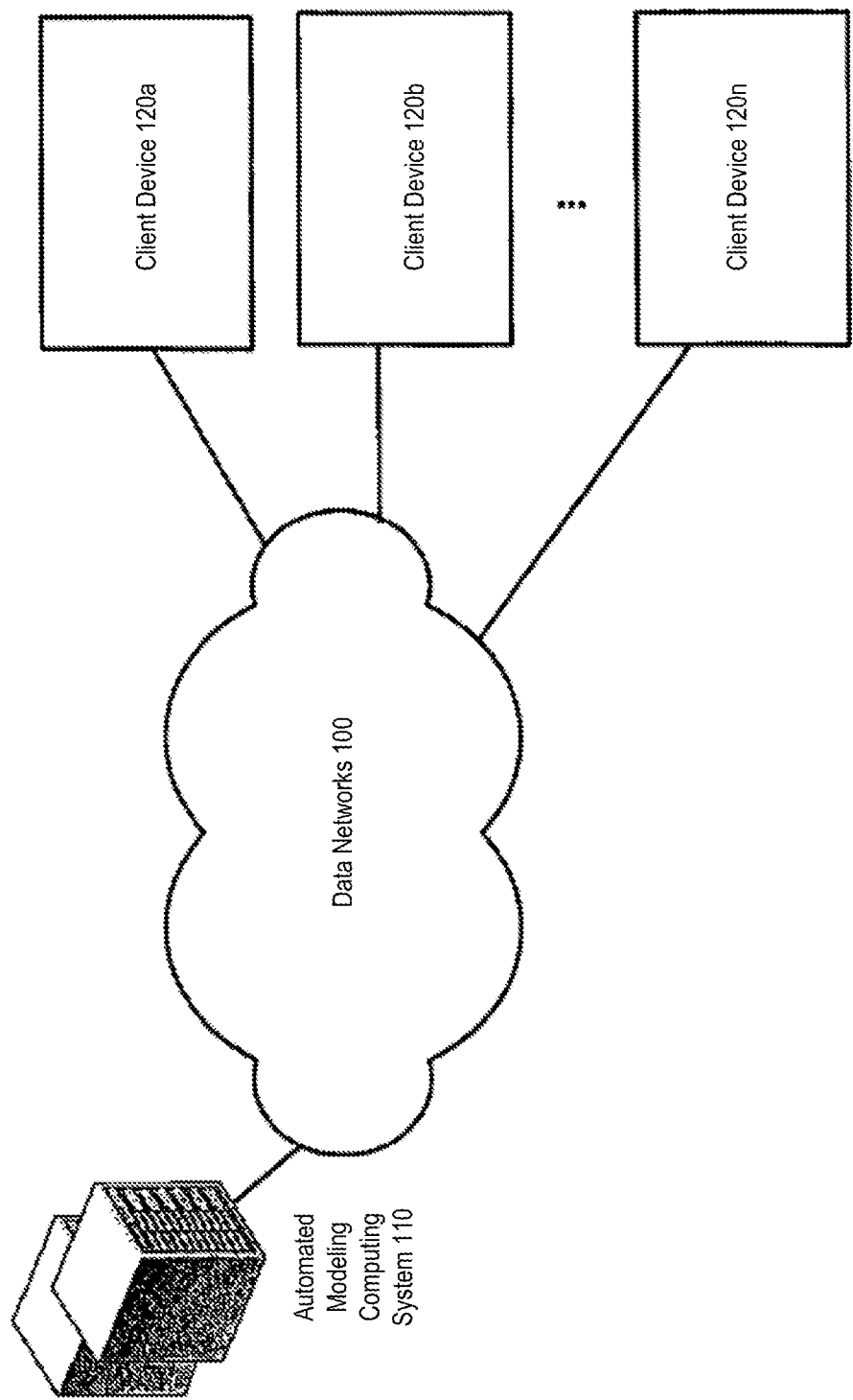
FIG. 1 depicts an example of a computing environment involving an automated modeling system that transforms and uses sufficiently sized, relatively homogeneous data segments, according to certain embodiments.

This disclosure describes embodiments that can involve transforming raw property data into sufficiently sized, relatively homogeneous data segments of training data for training or otherwise configuring computing systems that execute automated modeling algorithms. For instance, a computing system can transform raw data describing properties into segmented training data. The training data, which may include homogeneous segments of completed transactions, can be generated by clustering geographic data objects and building segments of transactions associated with those geographic data objects. The clustering and segmentation can be performed subject to one or more constraints, such as threshold segment size and similarity of clustered items, so as to improve the accuracy, precision, or both of automated modeling algorithms. For example, certain embodiments can cluster of geographic identifiers based on similarity, where the similarity is computed based on a distance in an N-dimensional space between vector representations of attributes associated with certain geographic regions.

According to various embodiments, a computing system can receive a plethora of raw data (e.g., property records, Census Tract data, etc.). The computing system can transform the raw data into segmented training data. For instance, the computing system can convert the raw data into the standardized data and select, from the standardized data, geographic unit identifiers that are associated with a completed transaction value greater than a threshold number of transaction suitable for a segment. The computing system can combine the selected geographic unit identifiers into individual clusters. The computing system can also combine completed transactions associated with the selected geographic unit identifiers into segments.

To further segment the data, the computing system can perform a similarity analysis on a set of possible pairs of the geographic unit identifiers. The similarity analysis can include comparing numerically valued attributes associated with the geographic unit identifiers. For instance, a geographic unit identifier having N numerically valued attributes can be represented as an N-dimensional vector. The N-dimensional vectors can allow a computing device to assess the similarity of a corresponding data objects in a manner that would be infeasible without a computing system due to the large number of attributes, different combinations of attribute values, etc. The computing system can compute similarity information about a pair of geographic unit identifiers by determining a distance between their corresponding N-dimensional vectors (e.g., a Euclidean distance in an N-dimensional). The computing system can combine remaining transactions, which have not been grouped into any of the existing segments, into one or more segments based on both the similarity information and the threshold segment size.

The computing system can train an automated modeling algorithm with the segmented training data. An example of an automated modeling algorithm is an Intelligent Automated Valuation Model (iAVM™), which accurately predicts an exchange attribute value (e.g., transfer price) for a target property.

In one example, the computing system identifies a suitable threshold segment size by iteratively testing samples segment sizes with respect to one or more automated modeling algorithms. For instance, in each iteration, the computing system can group training data (e.g., sample transactions) into segments. The segment size in each iteration can be decreased. The computing system determines, from the iterations, a segment size at which the performance (e.g., accuracy, precision, or both) of the automated modeling algorithm to degrades. The computing system selects a threshold segments size (e.g., a minimum number of transactions) above the segment size that causes the performance to degrade. Doing so allows for the required minimum segment size to be held constant for all segments, varied segment-by-segment by the clustering function value (e.g., attribute values used for clustering), etc.

Certain embodiments described provide improvements to computing systems that use artificial intelligence, such as automated modeling algorithms, to generate and output data by programmatically simulating human behavior. The accuracy, precision, or both of such simulations requires automated modeling algorithms to be trained with suitably clustered and segmented data. Prior systems that lack certain features described herein do not focus on defining clusters of a specific minimum number of clustered elements. Rather, these other prior systems seek to identify clusters only of maximum similarity, thereby leaving the number of clustered elements uncontrolled. Additionally or alternatively, automated modeling systems may involve segmenting large datasets with respect to many different types of attributes. To control for the effect of these attributes, model developers may manually evaluate smaller sets of attributes. Relying on these manual comparisons could exclude certain attributes required for precision or accuracy.

By contrast, embodiments described herein generate clusters composed of similar geographic objects along with associated segments. The clustering and segmentation described herein can be performed based on both a computed similarity, which is defined in a very high dimensional vector space that could not be assessed in the absence of a computing system, and a minimum number of transactions objects (i.e., a certain segment size). The improved segmentation provided by these embodiments enhances the performance (e.g., accuracy, precision, or both) of automated modeling algorithms, thereby improving the operation of systems that use automated modeling algorithms to simulate decision-making or perform other analytical operations. Some embodiments described herein are particularly suited to the implementation of automated model creation where a number of similar elements are clustered to attain a certain minimum cluster size based upon a total number of sub-elements in each cluster, but can also be adapted to cluster at simply the element level. The methods are particularly suitable because of their simplicity for use with very large data sets from which require the production of a very large number of segments and subsequent predictive models on those segments.

The clustering methodologies described herein can facilitate the provision of more homogeneous, segmented data for any modeling task that depends upon a minimum sized segment for accuracy, reliability, precision and/or usefulness. In on example, involving estimated values for property transactions, geographic data objects may be clustered to create segments of associated transaction objects, which can be used to produce independent valuations with associated quantifiable confidence scores. Then, the most accurate value may be reported or used for subsequent processing.

In the following description, for the purposes of explanation, numerous specific details are set forth in order to provide a thorough understanding of embodiments. It will be apparent, however, to one skilled in the art that embodiments may be practiced without some of these specific details.

Embodiments may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, Multimedia Cards (MMCs), secure digital (SD) cards, such as miniSD and microSD cards, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments may be described in the context of property valuation and clustering of transactions to create sufficiently sized segments using geographic data objects (e.g., records having geographic identifiers for certain properties, regions, etc.), certain embodiments can be used for other datasets and objects. The methodologies described herein may also be used to cluster objects that have no sub-elements into clusters of at least x elements by counting the number of elements assigned instead of summing the number of sub-elements as described herein. In short, the method of clustering described herein is thought to have applicability in any field or problem domain in which it is desirable to construct clusters of objects with numerically valued attributes.

Example of Automated Modeling System

FIG. 1 is a conceptual illustration of a high-level network architecture in which embodiments may be employed. In the present example, one or more automated modeling computing systems 110, which may be part of an application service provider (ASP) or web-based service, are coupled in communication with multiple client computing devices 120*a-n* via one or more data networks 100, such as the public Internet.

In some embodiments, one or more automated modeling computing systems 110 can provide an online service, such as subscription-based service that executed automated modeling algorithms that perform one or more of numerical modeling, analysis, and reporting in relation to exchange values (e.g., real property valuations). Depending upon the particular implementation, client computing devices 120*a-n* may access analysis and reports for target properties, or other attributes having multi-dimensional attributes, via a web-based interface, via batch submission and/or data feeds. In additional or alternative embodiments, all or some subset of the software and algorithms running on automated modeling computing systems 110 may be delivered to clients in the form of an application program for use on their desktop computers or other client computing devices.

Figure 2:
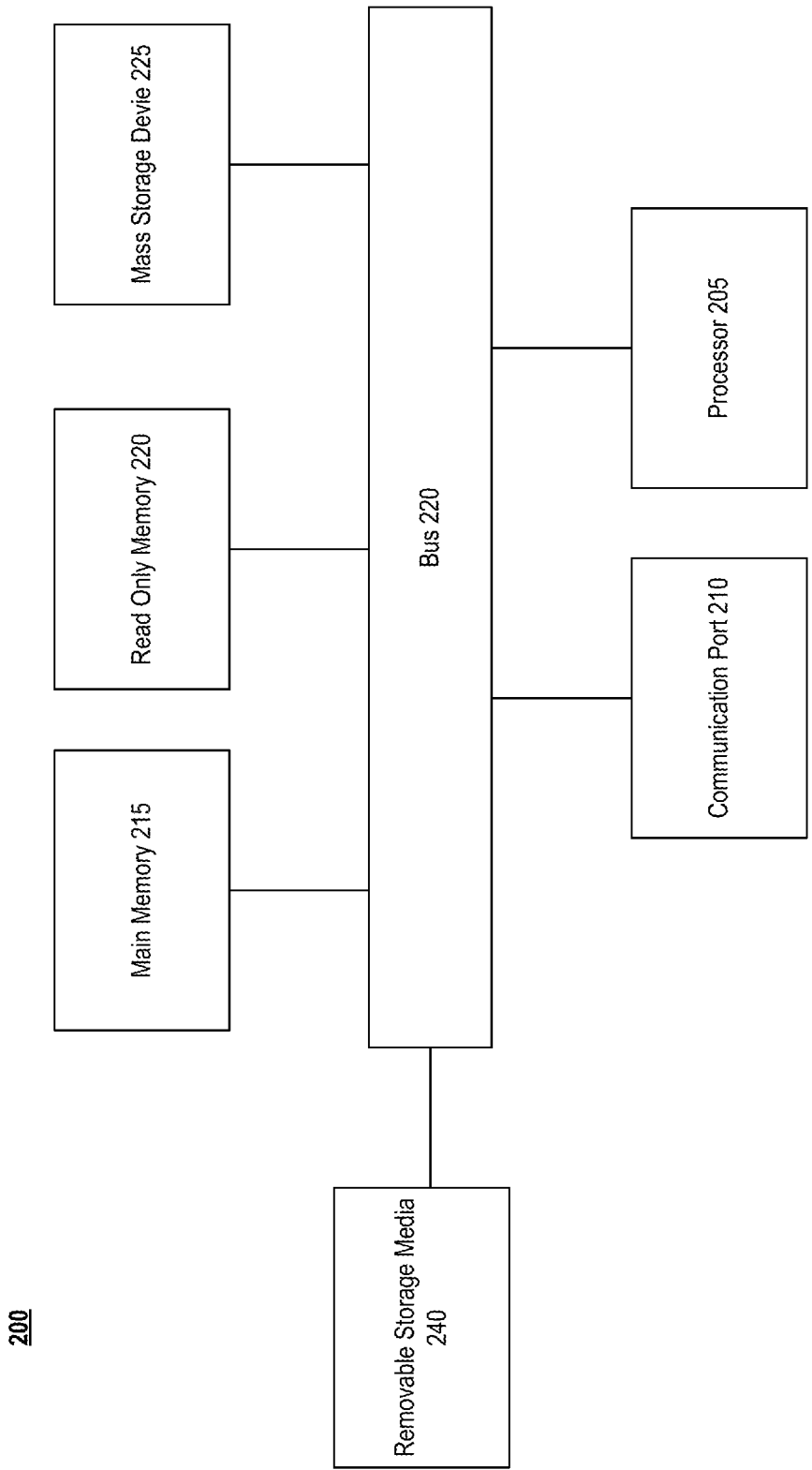
FIG. 2 depicts an example of an automated modeling computing environment system, according to certain embodiments.

Embodiments include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 2 is an example of computer system 200, which can be used to implement an automated modeling system or a client computing device or Web server, upon which or with which embodiments may be utilized.

According to the present example, the computing system includes a bus 230, at least one processor 205, at least one communication port 210, a main memory 215, a removable storage media 340 a read only memory 220, and a mass storage 225.

Processors 205 can be any known processor, such as, but not limited to, an Intel® Itanium® or Itanium 2 processors, or AMD® Opteron® or Athlon MP® processors, or Motorola® lines of processors.

One or more communication ports 210 represent physical and/or logical ports. For example one or more communication ports may be any of an RS-232 port for use with a modem based dialup connection, a 10/100 Ethernet port, or a Gigabit port using copper or fiber. One or more communication ports 210 may be chosen depending on a network such a Local Area Network (LAN), Wide Area Network (WAN), or any network to which the computer system 200 connects.

One or more communication ports 210 may also be the name of the end of a logical connection (e.g., a Transmission Control Protocol (TCP) and/or User Datagram Protocol (UDP) port). For example communication ports may be one of the Well Know Ports, such as TCP port 80 (used for HTTP service), assigned by the Internet Assigned Numbers Authority (IANA) for specific uses.

Main memory 215 can be Random Access Memory (RAM), or any other dynamic storage devices commonly known in the art. Read only memory 220 can be any static storage devices such as Programmable Read Only Memory (PROM) chips for storing static information such as instructions for processor 205.

Mass storage 225 can be used to store information and instructions. For example, hard disks such as the Adaptec® family of SCSI drives, an optical disc, an array of disks such as RAID, such as the Adaptec® family of RAID drives, or any other mass storage devices may be used.

Bus 230 communicatively couples processors 205 with the other memory, storage and communication blocks. Bus 230 can be a PCI/PCI-X or SCSI based system bus depending on the storage devices used.

Optionally, in the case of a server and typically in the case of a fixed client computing device, such as a desktop computer, operator and administrative interfaces 235, such as a display, keyboard, and a cursor control device, may also be coupled to bus 230 to support direct operator interaction with computer system 200. Other operator and administrative interfaces can be provided through network connections connected through communication ports 210.

Removable storage media 240 can be any kind of external hard-drives, floppy drives, IOMEGA® Zip Drives, Compact Disc-Read Only Memory (CD-ROM), MultiMedia Cards (MMCs), secure digital (SD) cards, such as miniSD and microSD cards, Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Data Retrieval and Standardization Examples

Figure 3:
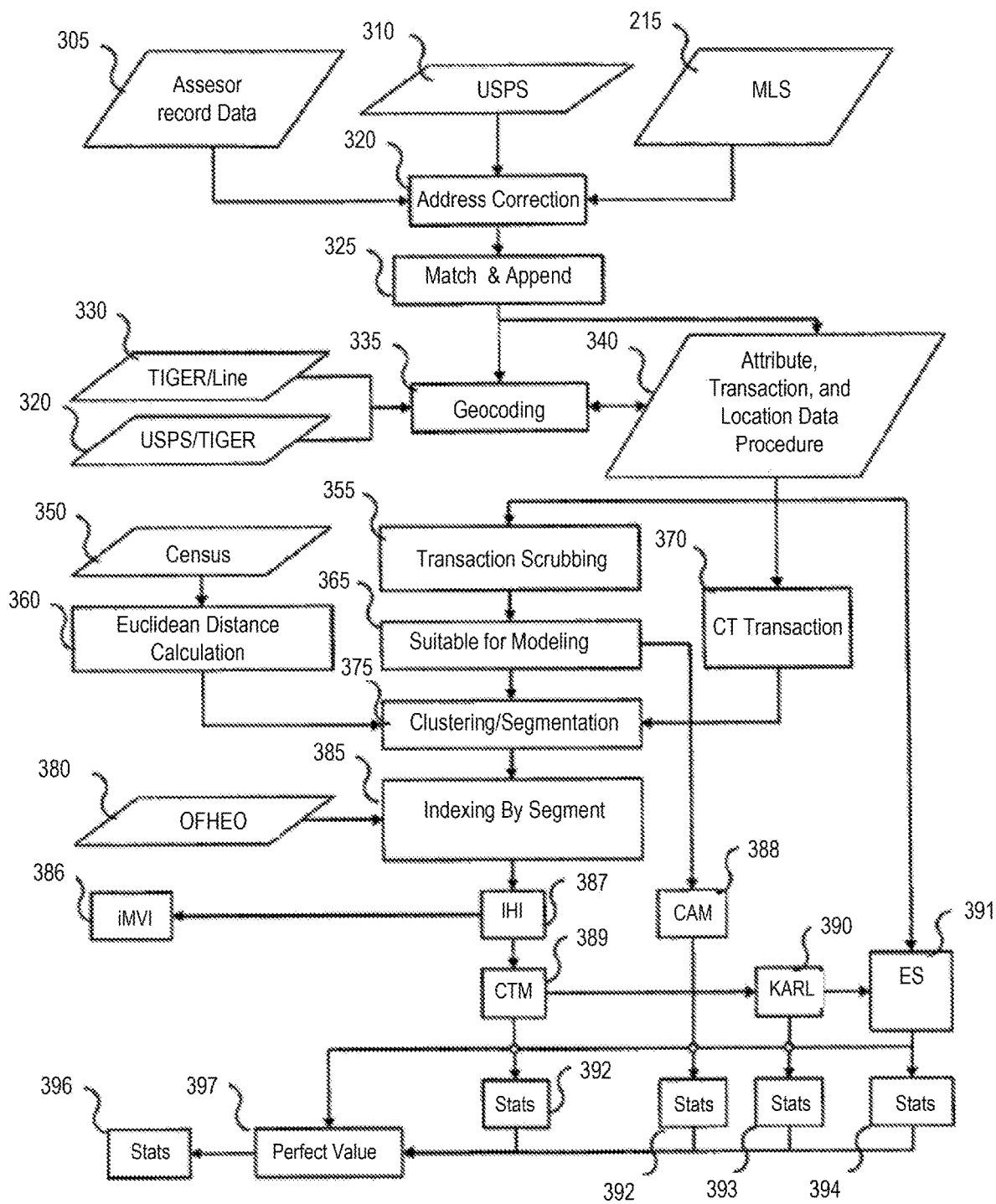
FIG. 3 depicts an example of data retrieval and aggregation performed by various functional units of the automated modeling computing system of FIG. 1 with respect to various external data sources, according to certain embodiments.
Figure 4A:
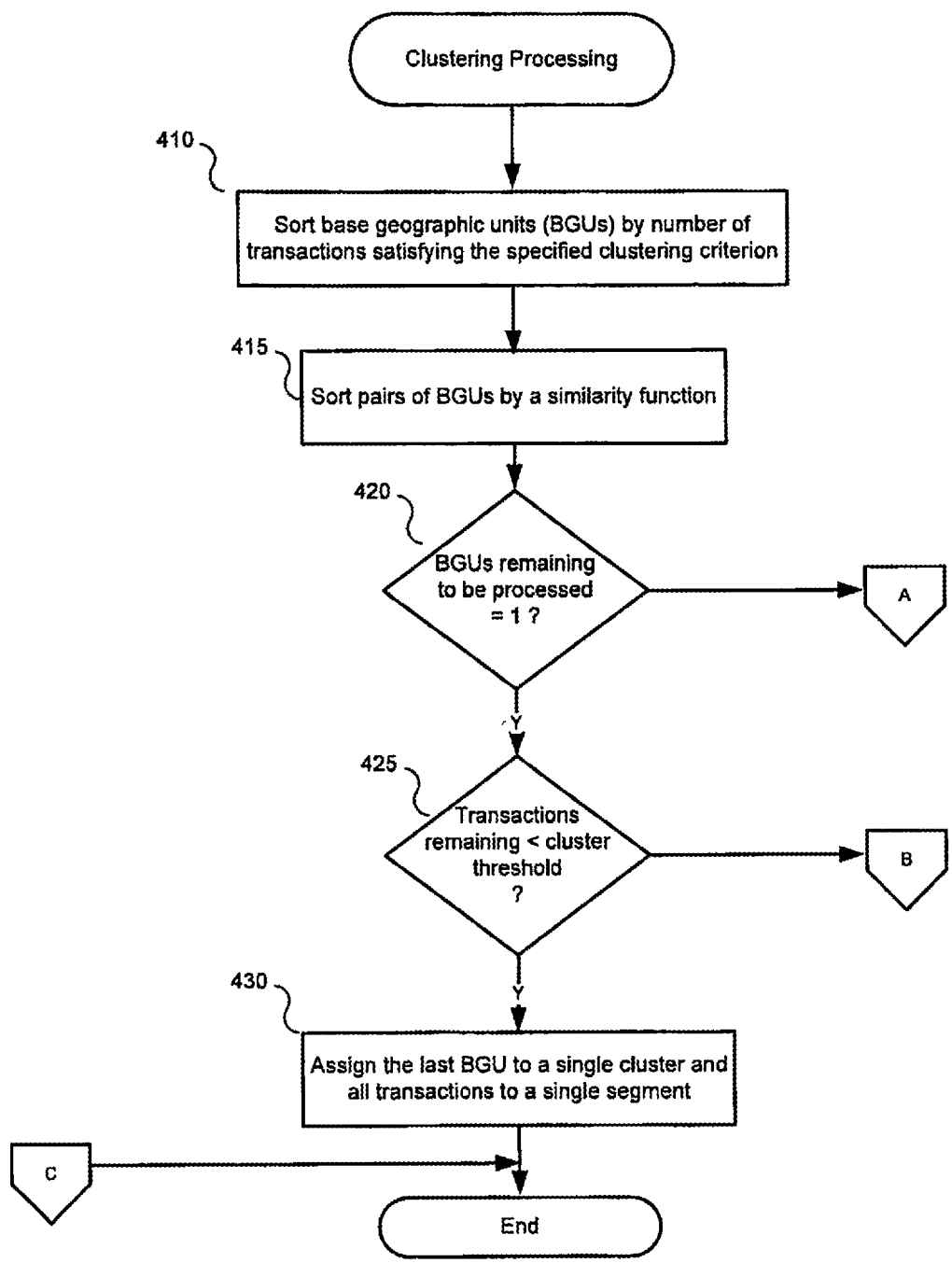
FIG. 4A depicts a portion of a clustering and segmentation process used by the automated modeling system of FIG. 1 to transform relevant datasets, according to certain embodiments.
Figure 4B:
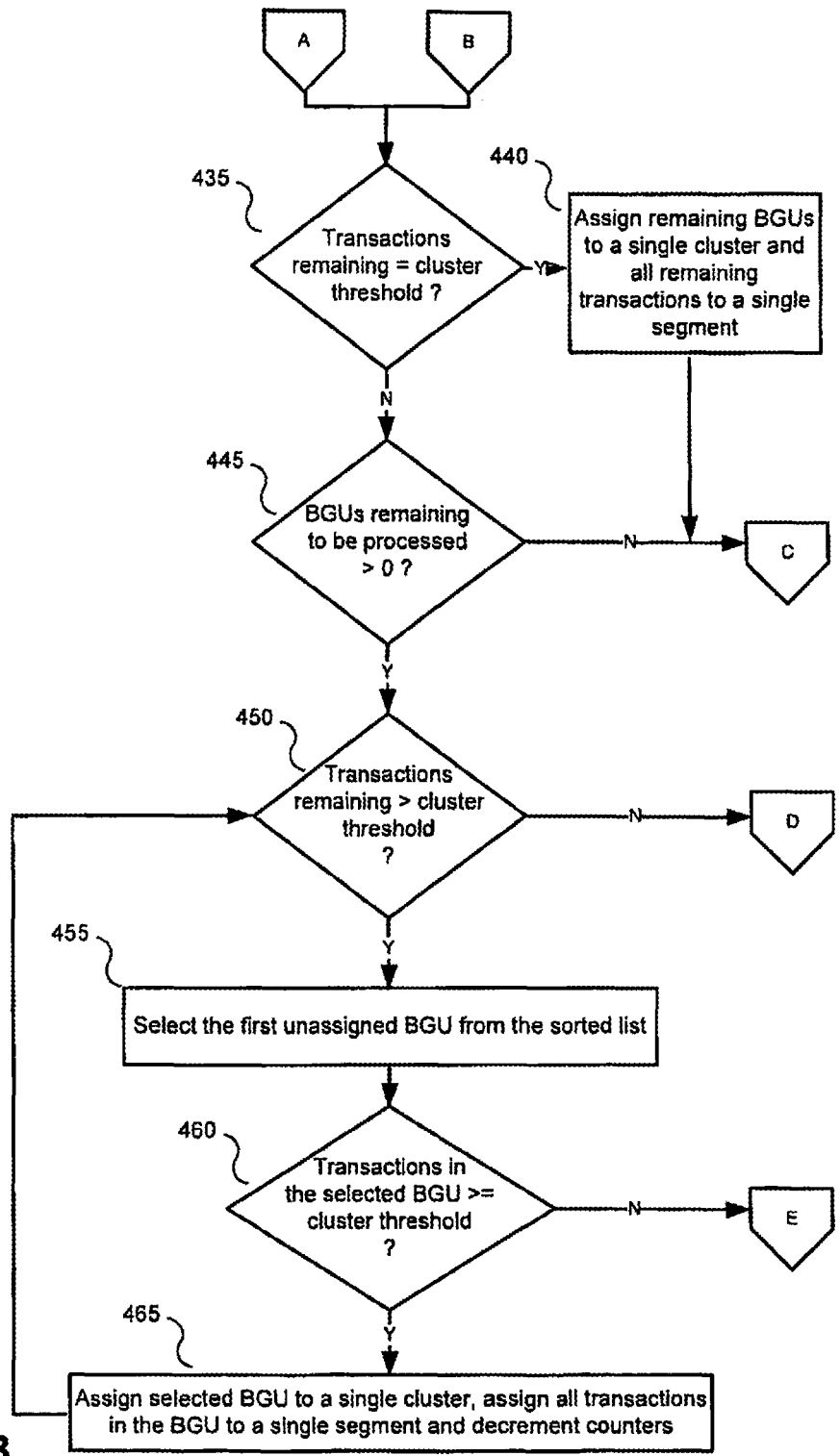
FIG. 4B depicts another portion of the clustering and segmentation process used by the automated modeling system of FIG. 1 to transform relevant datasets, according to certain embodiments.
Figure 4C:
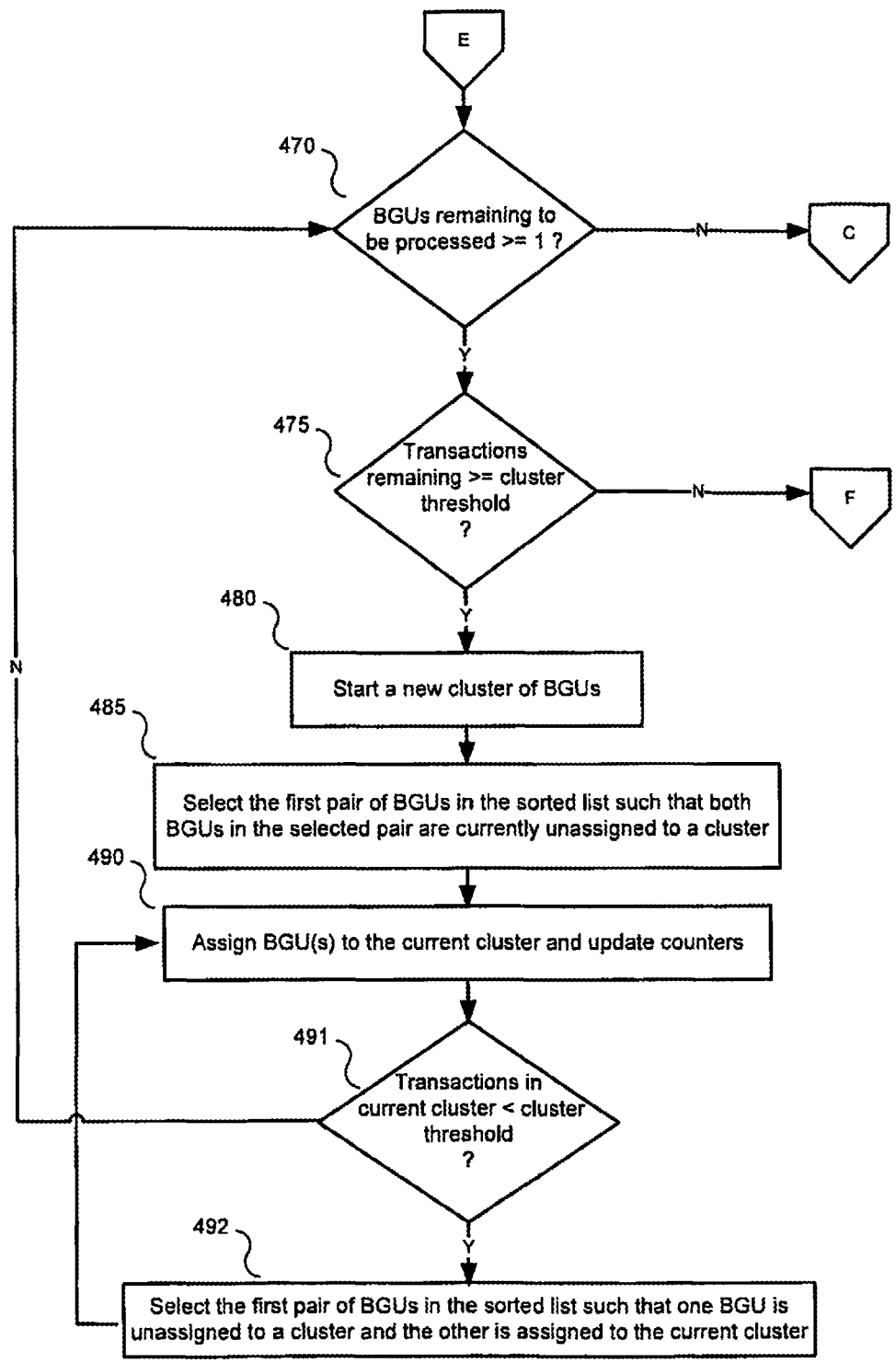
FIG. 4C depicts another portion of the clustering and segmentation process used by the automated modeling system of FIG. 1 to transform relevant datasets, according to certain embodiments.
Figure 4D:
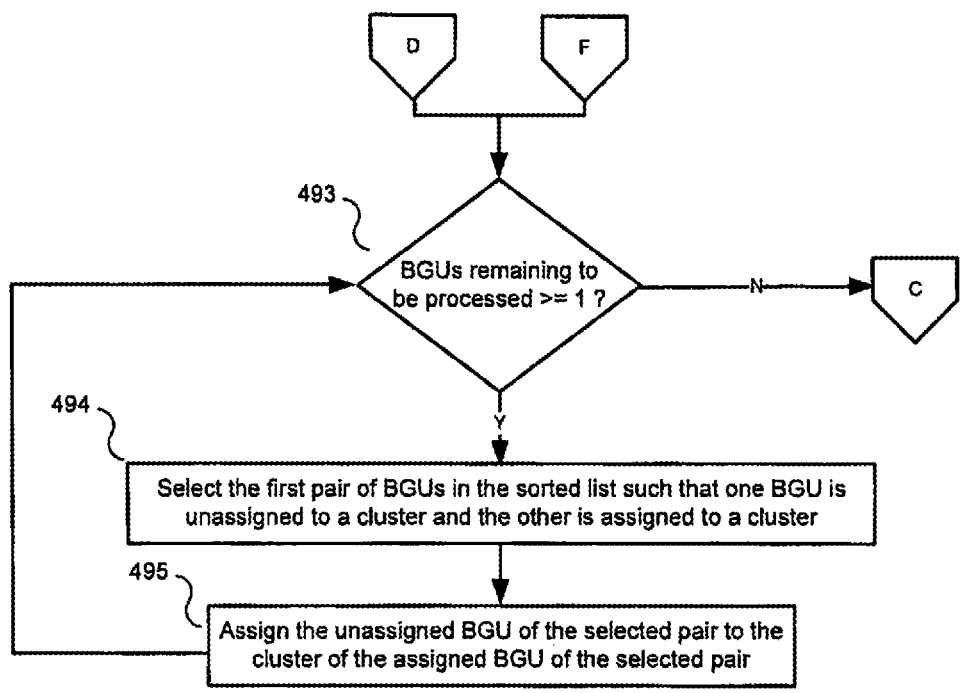
FIG. 4D depicts another portion of the clustering and segmentation process used by the automated modeling system of FIG. 1 to transform relevant datasets, according to certain embodiments.

FIG. 3 is a block diagram illustrating an example of data retrieval and aggregation performed by various functional units of the automated modeling computing system of FIG. 1 with respect to various external data sources, in accordance with embodiments. For illustrative purposes, the automated modeling computing system can interface, via different connections, to online property data providers that host data sources. But other implementations involving other types of data are possible.

In some embodiments, one or more servers of the automated modeling system can aggregate data feeds (e.g., the property records received via various data connections) from various data sources into main property attribute, transaction and location data structure 340. This aggregation can include a series of steps for combining different property records having different format into a single database schema including the normalizing of data from all providers into that schema. Examples of these data sources include, but are not limited to, exemplary assessor recorder data 305, USPS Address Data 310, MLS Data feeds 315, TIGER/Line 330, USPS TIGER/Zip+4 345, US Census 350 and Office of Fair Housing and Oversight (OFHEO) 380. The data provider systems can be originators of property records aggregators of commercial or partner data.

In one example, the process proceeds as follows for each data feed. The automated modeling computing system receives assessor recorder data 305 as periodic data feeds from different data sources. These data feeds can include property transaction data and attribute data for a tracked geographical area (e.g., data only limited to the United States of America). The automated modeling computing system receives assessor recorder data 305 as in a batch or transaction-by-transaction feeds. Typically, each real property is identified by a postal street address, Assessor Parcel Number and/or other unique or quasi-unique identifier, and each transaction is paired with a unique property. To facilitate identifying a property identified by postal street address all property addresses may be modified to conform to USPS addressing standards. The standardized addresses are compared to the USPS database 310 of deliverable addresses and any mismatches are noted in an address correction procedure 320. The original input addresses are recorded together with the standardized addresses and are appended to the incoming record and saved in an historical archive. These addresses together with other identifiers are the used to either identify a property that is already stored in Main Property Attribute, Transaction, and Location Data archive 340, using a record match-and-append procedure 325. The address correction procedure 320 also provides a reliable ZIP+4, 9 digit ZIP Code, for use in subsequent processes. A similar procedure is followed for all other attribute and transaction feeds from a plurality of sources such as MLS feeds and World Wide Web.

In the case that the incoming transaction, attribute or combination record from any of the aforementioned batch or streaming sources is located in the database the incoming record is scanned for changes, an updated attribute record including merged attributes replaces the existing record, the previous record is stored in the historical file for the subject property, and if the record contains transactional information such as a transfer of ownership, the transactional information is added to separate serial transaction file for the subject property. Each transaction added to the serial transaction file for each subject property is classified as a duplicate of another transaction, free market transaction, provisional free market transaction, company transaction, foreclosure transaction, non-arms length transaction, distressed transaction and so forth based upon statistical and logical tests at the time of insertion into the serial record. The utility of some exemplary classifications are described below in this document. Classification of individual transactions are revised periodically based upon continuously recalculated statistics of the segment to which the property belongs, as described below, and the classifications are adjusted from time to time as needed for the production of the products and reports that are produced from the data structure. In various embodiments, each transaction can be a member of multiple classifications. Any property matched to an existing record set in the property attribute, transaction, and location data structure 340 is recorded as described above. New properties, those not matched by record match-and-append procedure 325 or periodically all properties are submitted or resubmitted to a geocoding procedure 335. The geocoding procedure 335 uses the standardized address to identify an appropriate set of records in the TIGER/Line database 330 updated periodically by the Census. These records are identified within the database by their TIGER/Line ID (TLID) (not shown).

To facilitate locating the appropriate TLID for a particular record the USPS data 345, comprised in this embodiment of TIGER/ZIP+4 database (which is frequently employed by the geocoding procedure 335 to reduce processing time, as this database is cooperatively created by TIGER and USPS) cross references of TLIDs and ZIP+4 Codes, 9 digit ZIP Codes may be used. Other methods to speed processing of the identification of the correct TLID also include the use of commercially available address standardization/correction geocoding packages that return the TLID as part of address standardization. Once the correct TLID is identified, the geocoding procedure 335 allows the extraction and appending of location attributes including, but not limited to, the interpolated longitude and latitude, school district, county, Census tract, Census block, Census block group, side of the street, proximity and relative to each subject property the direction to water, railroads, public transportation, shopping, commercial areas, major highways, major streets, and other relevant attributes directly as retrieved from TIGER/Line 330 or through computation known to those skilled in the art. The aggregation of Digital Elevation Model data (not shown), with the latitude and longitude allows each property elevation to be recorded as well, allowing accurate indications of topography and visual attributes, such as scenic views, to be appended as value influencing attributes.

The geocoding procedure 335 may be proprietary code implemented explicitly for the aforementioned purposes or commercial software and data may be used to fulfill this functionality. The attributes thus appended are utilized as indicators of property value or directly in a clustering/segmentation process 375 as will be described elsewhere in this document.

In some embodiments, a transaction scrubbing process 355 is the first step of classification of transactions into free market, etc., categories described above. In various embodiments, this process takes place at the county level of granularity. In such cases, this means that only transactions from a single assessor/recorder data originator are considered together for statistical purposes. The transaction scrubbing process 355 classifies certain transactions. First, land subdivision transactions may be identified based upon a threshold number of geographically grouped parcels, having identical transaction dates and identical or nearly identical prices that are inordinately high relative to the properties' probable value. After these transactions are identified and classified in the data, all assessor/recorded coded transactions indicative of non-free market status may be classified accordingly. The various transaction classes identified may then be used to create other data products, which will be described later in this document.

The free-market class of transaction is used to create the retail products including, but not limited to, retail price trends and to serve as training sets for the retail Automated Valuation Model ("AVM"), while wholesale, distressed, company owned and other transaction classes are used to generate price trends and as training sets for the wholesale, distressed, company owned and other transaction classes, AVMs and other wholesale, distressed, company owned products. In some embodiments, each class of transaction receives independent but similar treatment. For simplicity and in an effort to avoid needless repetition, only the process to generate retail trends, AVM products and other products will be described. The existence and implementation of parallel processes for other classes of transactions will be understood by those skilled in the art.

In some embodiments, the only AVM model to produce valuations without prior clustering/segmentation is the Corrected Assessor Model (CAM) 388. CAM 388 receives retail classified transactions for each land use type (also herein called "property type") and compares the actual recorded transaction values within a given time period, in this embodiment the one year or 18 months used by the assessor to calculate her own property values, with the assessor calculated market value, assessed value, appraised value, etc., depending upon what values the assessor of each jurisdiction collects and reports in the data for her jurisdiction. This produces a bulk median ratio of each assessor value to the real transactions, and a distribution of errors that is iteratively adjusted to minimize the total error and the standard deviation of percent errors for each property type for each of the several values returned by the assessor and for each quartile of assessed values, full market values, etc. returned by each assessor. The ratio and calculated adjustments can then be used to estimate the retail value of each property for which the assessor returns any one or several values of the aforementioned assess or generated values to generate the CAM valuation. The rest of the transactions in, for example, the retail (also called herein the free market) classification are then subjected to the clustering/segmentation process 375.

Segmentation performed in the clustering/segmentation process 375 can involve grouping together of homogeneous, relative to certain attributes (e.g., property type, price quartile, etc.), geographic data objects (e.g., data objects representing Census Tracts/ZIP Codes—both of which may be used in some embodiments), by number of completed transactions (e.g., retail transactions) to assure that a sufficient number of transactions is available to train the individual automated modeling (e.g., one or more of a Corrected Trend Model (CTM) 389, KARL 390, a hedonic multiple regression model, and Expert System (ES) 391).

ES 391 is a computer-executed algorithm using "Comparable Sales Methodologies" that infer the value of a subject property by referring to transaction values for nearly identical properties; when property attributes are not identical the property is treated as a collection of valued attributes (differentiated good) that together sum to the total value of the property thus allowing for valuation corrections based upon attribute differences. KARL is a computer-executed algorithm that performs linear and/or non-linear piecewise regression on transaction values of segmented properties and their associated attribute data that determines the hedonic value of the individual attributes. Weightings determined by KARL provide input to ES that improves valuation adjustments based upon attribute differences. CTM is a computer-executed algorithm that generates price indices for each segment, establishes each transaction's value relative to the generated trend line and allows the correction of a transaction value to past or future time (time shifting). CAM is a computational methodology that automatically extracts the assessment ratio from a segment of data thus allowing valuations to be extracted from county assessor valuations. These automated modeling algorithms compute exchange attribute values (e.g., trend lines, indices, AVM Valuations for past, present or forecastable future time, to predict, given loan attributes, Loan to Value ratios, predict current equity, to monitor loan performance, identify flipping, value market risk, value portfolios of loans and properties, and a plurality of other products as demanded from time to time by the market), to identify fraudulent transactions, and or to compute some other predictive or analytical output.

The predictive or analytical outputs produced by any of these methodologies and other existing and future property valuation methodologies are improved by better segmentation of supplied data. In some embodiments, the quality, accuracy and precision of automated modeling algorithms are dependent upon using segments that are homogeneous relative to reaction of their values to the net of the market forces at work in a given segment. Clustering agglomerates similar areas populated with properties with specific attributes that have transactions that can be segmented to train models and produce the aforementioned products. The details of clustering and segmentation are described in detail below.

Once segments of transactions of properties are defined, the transactions are submitted to an Intelligent House Price Indexing by Segment process 385 where another round of statistical outlier identification is performed in each segment for each year and quarter. This process identifies outliers in skewed distributions. After this cleansing process, the remaining transactions for each segment are trended and the trends are indexed. This process uses the actual remaining segment transactions for each year and quarter. As described further below, in some embodiments, the clustering/segmentation process 375 assures that each segment has a sufficient count of transactions to create a robust trend line. The median transaction price in each homogeneous segment is calculated and is recorded as the median price trend point for its respective segment. In various embodiments, there are approximately 15,000 individual retail Census tract-property type based segments in actual production, which cover more than 800 counties and approximately 85% of all residential properties in the USA. Occasionally, there are insufficient transactions in an isolated year and quarter to create a robust median; in this case the missing points may be interpolated between two actual quarterly points. In even rarer cases, a number of successive quarters cannot be calculated; in this second case, the percent change in House Price Index (HPI) for the relevant CBSA as published quarterly by the OFHEO may be used to approximate the missing trend points. In some embodiments, standard statistical comparisons between the resulting trend lines are used as a quality assurance method e.g. R-Square, total absolute difference, etc. According to various embodiments, trend lines are also similarly produced for each aforementioned class of transaction or difference between trend lines, selected ratios as well as for each class of transactions at the ZIP Code, ZIP Code Tabulation Area, County, Core Based Statistical Area, Census Division, Census Region and the Nation levels. Both weighted average rollups of more granular segments to these levels or stand-alone trends may be directly produced at the various geographical granularities. These trend line products can be delivered as median price trends or for convenience of comparison indexed to a value of 100 at any convenient base date using standard indexing arithmetic well known to those proficient in the art.

One type of index produced in two temporal granularities, annual and quarterly, the Intelligent Housing Index (IHI) 387, is used as the base index for the Intelligent Market Volatility Index ("MVI") 386, an annual and quarterly segment level and weighted average rollup to County, CBSA, State and National levels. At the "IHI" segment level the IHI 387 is identical with the iMVI 386.

The IHI 387 is also used internally to "time correct" transaction prices. The "time corrected" transaction prices are the output of a CTM 389, which delivers valuations on previously sold properties and is one of the four basic valuation methodologies supplying property valuation to Perfect Value 397. CTM 389 operates on the assumption that the transaction values of homogeneous sets (segments) of properties produced by the clustering/segmentation process 375 as they respond to the local market forces follow the "IHI" trend line. This means that if a property was valued at e.g. $100,000 one year ago and the percent change in the "IHI" for the segment was e.g. 10% then today's most probable transaction value for that property today would be $110,000. Since it is impractical to value more that 80 million properties daily, IHI 387 may be used to time shift stored AVM valuations between valuation dates as the system continuously cycles through segments and refreshes valuations of all properties in every segment as the system cycles through them. Periodic valuations may be captured over time for all properties creating a historical record of property values. In some embodiments, these values are trended and the resulting trends indexed creating a plurality of trend lines/indices, one for each property. These trend lines/indices may be used to create periodic statistical report products on demand that allows a complete view of the state of the housing market as any point in time and at any desired granularity.

Another use of IHI 387 by way of CTM 389 as described in the preceding paragraph is to create robust training sets for KARL 390. In some embodiments, KARL 390 is an AVM which produces valuation estimates and attribute weights. Because of the extreme granularity of the segments produced by the clustering/segmentation process 375, the number of transactions from the suitable-for-modeling process 365 in the very recent past relative to the desired value date may be suboptimal for training a robust regression model. In this case, CTM 389 is used to time correct the most recent transaction values to the desired value date either forward or backward in time until enough transaction values are available to provide sufficient records to produce a robust multiple regression models. The optimal number is determined by iteration of model training, model testing and adjustment of the size of the training set until the optimal balance between training set size and model accuracy is achieved. At any rate, in various embodiments, the clustering/segmentation process 375 always creates segments with a sufficient number of transactions to support a robust model after time shifting even with a margin of error, which is one of its extreme strengths. Using this iterative methodology, KARL 390 is able to produce an optimally robust model in almost every case.

The ES 391 makes use of both the IHI 387 trend lines and their indices and the segments produced by the clustering/segmentation process 375, as well as some outputs of KARL 390. ES 391, in the present embodiment, can either automatically emulate the actions of an expert appraiser or can assist an expert human appraiser to produce property appraisals and supporting reports. ES 391 searches the database for comparable properties, first within an expanding distance band about the subject property using algorithms within geocoding procedure 335 until it reaches the geographic boundary of a selectable geographical area e.g. Census block, block group, ZIP+2, etc. If it fails to find suitable nearby comparable properties with recent transactions, it reverts to seeking comparable properties not by distance but within the cluster of possibly geographically discontinuous properties corresponding to geographic data objects included in the segment for the property type and price tier of the subject property to prevent seeking comps in inappropriate areas. To improve the accuracy of comparable pricing within the automatic ES application 391, the values of comparables is time shifted if necessary using the IHI 387 index for the segment. In addition, KARL 390 produces attribute weightings that quantify the relative importance of property attributes within each segment which ES 391 uses to more accurately adjust comparable properties for attribute differences compared to the subject property. In the same way, KARL 390 identifies the hedonic value of each property attribute.

For each model, the training testing process produces a set of statistics: CTM Stats 392, CAM Stats 393, KARL Stats 394, and ES Stats 395. In some embodiments, these statistics include more than 120 individual measures that fully characterize the performance of the model by various measures, including, but not limited to, complete distribution of percent errors and other standard statistical measures well known to those skilled in the art together with a confidence score and a "One Score" measurement that measures the total quality of a model's accuracy and precision and allows absolute ranking by this single measure. In some embodiments, the transactions agglomerated for each segment by the clustering/segmentation process 375 are apportioned into two sets by simple random sample. One of the two simple random samples contains eighty percent of the transactions identified by the suitable-for-modeling process 365. This is called the training set, and the remaining twenty percent of the transactions are called the test set or holdout sample. The training set is used to train the models and the holdout sample is used to measure the accuracy and precision of the resulting model. All of the transactions have a known or reference value. After a model is trained, it is applied to every property in the hold out sample to produce a model estimated valuation. The real transaction values are then mathematically compared to the estimated valuations to determine the percent error of each estimated valuation relative to the real transaction value. The statistics for each valuation methodology, as detailed above, are computed and stored for each methodology for each segment. Since the holdout sample for each model is comprised of exactly the same records for all models trained for each segment, the resulting statistics are a fair and comparable representation of the relative performance of each valuation method within each segment.

The final output of the AVM is produced by Perfect Value 397, which uses the statistics of each individual valuation methodology feeding it to determine either which valuation methodology's output is to be selected as the delivered AVM value or alternatively produces a blended valuation when there is no clear winner. After all the records in the segment holdout sample are valued by Perfect Value 397, PV Stats 396 are computed in the same manner as described for each of the other valuation methodologies, CTM 389, CAM 388, KARL 390 and ES 391. The PV Stats 396 and the valuation output produced by Perfect Value 397 can be outputted by an automated modeling system together with iMVI 386 indices, detailed comparables, risk scores, confidence scores, etc. produced by the system.

In the environment of the present example, the various functional units have been described as if they were all implemented within a single automated modeling computing system. But in additional or alternative embodiments one or more of these functional units may be implemented within a separate server or executed within a host system. For example one server may be dedicated to information gathering and another may be dedicated to modeling.

In some embodiments, the functionality of one or more of the above-referenced functional units may be merged in various combinations or further divided into additional functional units. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

In some embodiments, the functional units can be any suitable type of logic (e.g., digital logic, software code and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media or flash memory devices.

Clustering Processing Overview

According to various embodiments, clustering methodologies are used to facilitate the provision of relatively homogeneous, segmented real estate transactional data which can then be used in the context of various numerical modeling and/or analysis, such as real property valuation, generation of price indices, calculation of trend lines and fraud detection. The clustering methodologies described herein are particularly useful in connection with defining clusters of at least a specific minimum number of clustered elements as may be required by particular mathematical models.

In some embodiments, a method of clustering utilizes census tracts as defined by the US Census Bureau as the geographic identifier for various geographic data objects (e.g., property records having a geographic identifier for a particular census tract). The method of defining geographic similarity between geographic data objects may utilize a subset of the statistics collected by the US Census Bureau Decennial Census, 396 for each Census Tract. In some embodiments, the statistics are normalized across all Census Tracts after weighting within Census Tracts, if required. Then, Euclidean distances between all possible pairs of Census Tracts in each county are computed for all counties computing the distances from the weighted and normalized Census statistics. The method can be used with numerical attributes in any number of dimensions from any source and some sources other than US Census Bureau statistics may be used in accordance with various embodiments.

In the context of some embodiments described herein, groupings of Census Tracts are called clusters and groupings of transactions by property type (or some other attributes or clustering function) are called segments. Transactions are transfers of ownership of real property from one party to another in which one party, the buyer, gives money to another party, the seller, in consideration of the transfer of ownership of the real property from the seller to the buyer. Depending upon the property type, the real property transferred can be a demarcated area of land, called a parcel, or multiple parcels; a structure, called an improvement; a parcel or parcels together with the associated improvements; some part of an improvement with or without ownership of the parcel; or rights to use part of the improvement. The amount of money exchanged is the measure of the value of the real property if the transfer is a free market exchange.

Every property has a physical location, e.g., latitude and longitude, and every physical location resides in some hierarchical area (e.g., a Census Block, Census Block Group, Census Tract, County, State, and Nation). In various embodiments, the areas, as described in the corresponding geographic data objects, each have numerically valued statistical data that capture the attributes of the demographic, social, and economic environment in which the property resides at various hierarchical levels. For purposes of the simplified concrete example discussed below, only transactions on a single property type are in a single segment. For purposes of this discussion, a transaction has the location of the parcel or parcels on which the transferred property is situated and can therefore be assigned to a unique Census Tract. In cases where parcels or multiple parcels reside in more than one Census Tract, the transaction is defined as existing in the Census Tract with the larger or largest land area. In the example described below, all segments include only one property type. Every Census tract is assigned to one segment for each property type that has at least one property of that type situated within it. This means that each Census Tract may be and usually is assigned to more than one segment, but each transaction belongs to one and only one segment. In some embodiments, a cluster of Census Tracts does not include Census Tracts from more than one county. Some very large counties are divided into several geographical areas to facilitate processing.

Clustering and Segmentation Examples

In some embodiments, a minimum required number of sample transactions is established for a segment by making models on successively smaller sets of typical training data and noting at what set size the accuracy and/or precision of the models begins to degrade. The minimum number of transactions, segment size, is then set comfortably above that number of transactions. The method allows for the required minimum segment size to be held constant for all segments or varied segment-by-segment by the clustering function value (e.g., property type, transaction type, property style, price tier, etc.) or for statistical reasons at need.

In one example, transactions are assigned to the correct geographic identifier, e.g., a Census Tract. Example transactions for every geographic data object (e.g., real property record or standardized data object derived from the property record) of meeting a clustering function, e.g., a particular type, in each county are statistically and geospatially scrubbed to exclude all except free market transactions. The remaining transactions are marked suitable for clustering. The number of suitable transactions are counted and recorded for each geographic identifier (e.g., Census Tract) by permissible clustering function value (e.g., property type). The statistics (i.e., attribute values) for each geographic data object are collected, weighted, scaled and the resulting values stored.

For each county, every possible pair of geographic data objects is identified and a similarity function (e.g., the Euclidean Distance), is calculated between each pair and recorded using the stored attribute values. In some embodiments, this computationally expensive activity need only be performed once for all possible pairs of geographic identifiers; thus representing a dramatic improvement over existing agglomerative methods that require dynamic recalculation of the distance metric between the current state of the cluster and all prospective members of the cluster as the clusters are being built.

FIG. 4 is a high-level flow diagram illustrating clustering processing in accordance with an embodiment. Typically, clustering is performed on the basis of a function of one or more attributes of the properties or transactions at issue. In some embodiments, the process is run once for each county-property type combination. Notably, however, the clustering variable, criteria or function may be other than property type. For example, a clustering function may be based on any attribute, characteristic or combination thereof in relation to a property or transaction. For purposes of the present example, only a single iteration of the clustering process is described for a clustering criterion.

At block 410, all geographic data objects (e.g., base geographic units ("BGUs")) are sorted by the number of transactions satisfying the specified clustering criterion. In some embodiments, the geographic data objects correspond to Census Tracts, and may be sorted in descending order in a county by the number of transactions on a single property type. In some embodiments, if the total number of transactions for all geographic identifiers meeting the specified clustering criterion is less than a particular threshold, then all transactions may be assigned to a single segment and the clustering process terminated. In some embodiments, the threshold may be two times the clustering threshold, e.g., the desired minimum number of transactions within each segment.

At block 415, assuming the clustering process is to proceed, all possible pairs of geographic data objects are sorted by a similarity function. In some embodiments, all possible pairs of CTs in county are sorted in ascending order by Euclidean Distance (ED) calculated against weighted scaled Census Bureau or other numerical statistical attributes of each CT.

At decision block 420, it is determined whether there is only one geographic data object remaining to be assigned to a cluster. If not, processing branches to off page connector A, which feeds into decision block 435 of FIG. 4B. Otherwise, if this is the last geographic data object to be assigned, then processing continues to decision block 425.

At decision block 425, it is determined whether the number of transactions remaining to be assigned to a segment is less than the cluster threshold (e.g., the required number of transactions for a single property type in a county). If so, processing branches to block 430, otherwise processing continues via off page connector B, which feeds into decision block 435 of FIG. 4B. It is to be noted that the cluster threshold may be a different number or the same number for different values of the clustering function or for different segments. The cluster threshold, e.g., the minimum number of transactions desired for a segment may be experimentally or statistically determined and may be an input to the clustering process from another part of the system. As indicated above, a minimum sized segment may be determined that maintains desired accuracy, reliability, precision and/or usefulness of a modeling task. For example, a minimum required number of sample transactions may be established for a segment by making models on successively smaller sets of training data and noting at what set size the accuracy and/or precision of the models begins to degrade or falls below the desired values. The cluster threshold may then be set comfortably above that number of transactions.

At decision block 430, it has been determined that the last geographic data object is being processed and that the number of remaining transactions falls below the cluster threshold, therefore this final geographic data object is assigned to the current cluster (or a new cluster if one has yet to be created) and all transactions meeting the current clustering criterion (e.g., being of a particular property type) are assigned to the current segment (or a new segment if one has yet to be created). At this point, clustering processing is complete for the current clustering criterion (e.g., one representative value of a clustering function) and clustering processing may be repeated for other clustering criteria to create segments of appropriate size for other property types, for example.

At decision block 435, it is determined whether the number of transactions remaining to be assigned is equal to the cluster threshold, if so then processing branches to block 440. Otherwise, processing continues with decision block 445.

At block 440, all the remaining geographic data objects are assigned to the same cluster, all remaining transactions are assigned to the same segment and clustering processing for the current clustering criterion is complete.

At decision block 445, it is determined if the number of geographic data objects remaining to be processed is greater than zero. If so, the processing continues with decision block 450; otherwise processing for the current clustering criterion is complete.

At decision block 450, the total number of remaining transactions is tested to determine if there is a sufficient number of transactions to make a complete cluster. If there are enough transactions to make a complete cluster, then processing continues with block 455; otherwise processing of this case continues via off page connector D, which feeds into decision block 493 of FIG. 4D.

At block 455, the first unassigned geographic data object is selected from the sorted list, which in some embodiments, represents the geographic data object with the largest number of transactions for the current clustering criterion.

At decision block 460, a determination is made regarding whether the number of transactions in the selected geographic data object is greater than or equal to the cluster threshold. If so, then the geographic data object is large enough to make up a single cluster and processing continues with block 465; otherwise this block of logic terminates because there are no longer any unassigned geographic data objects of sufficient size to make up a single cluster and processing branches via off page connector E, which feeds into decision block 470 of FIG. 4C.

At block 465, it has been determined that the selected geographic data object is of sufficient size to represent its own cluster, therefore the selected geographic data object is assigned to a single cluster, all transactions associated with the geographic data object and meeting the current clustering criterion are assigned to a single segment and the counters are decremented (e.g., the total number of remaining transactions is reduced by the number of transactions in the geographic data object meeting the current clustering criterion and the number of geographic data objects remaining to be processed is decremented by one).

The case in which the number of transactions remaining is greater than the cluster threshold and the number of transactions in the current geographic data object is less than the cluster threshold is now described starting with decision block 470.

In the loop represented by blocks 470 to 492, all remaining geographic data objects are smaller than the cluster threshold, therefore according to the present example, unassigned pairs of geographic data objects having the most similarity among remaining pairs of unassigned geographic data object are first assigned to a new cluster and additional geographic data objects are assigned to the cluster based on their similarity to a geographic data object already in the cluster.

At decision block 470, it is determined whether the number of geographic data objects remaining to be processed is greater than or equal to one. If so, then processing continues with decision block 475; otherwise processing terminates for the current clustering criterion.

At decision block 475, the number of transactions remaining is tested against the cluster threshold. If the number of transactions remaining is greater than or equal to the cluster threshold, then processing continues with block 480; otherwise processing branches to off page connector F, which feeds into decision block 493 of FIG. 4D.

At block 480, a new cluster of geographic data objects is initialized. In some embodiments, various counters/variables may be maintained on a global, per cluster and per segment basis. In such embodiments, at this point in the processing, appropriate counters/variables are set to their initial values.

At block 485, the first pair of geographic data objects is selected from the list sorted in descending order by a similarity function meeting the condition that both geographic data objects in the selected pair are currently unassigned to a cluster. In some embodiments, the similarity function is a Euclidean distance calculation involving a distance measurement between the two geographic data objects in N-dimensional space represented by N numerical attributes. In other embodiments, various other similarity functions may be used to determine how close in N-dimensional space the geographic data objects are. For example, Mahalanobis distance or Chi-2 distance may be used.

At block 490, both geographic data objects in the selected pair of geographic data objects are assigned to the new cluster, all transactions in the geographic data objects meeting the current clustering criterion are assigned to the new segment and the counters are updated (e.g., geographic data objects to be processed decremented by two, transactions to be processed reduced by the number just assigned to the new segment, etc.)

At decision block 491, a test is performed to see if the current cluster is complete by comparing the number of transactions in the current cluster to the cluster threshold. If the number of transactions in the current cluster is less than the cluster threshold, then processing continues with block 492 to continue to build the current cluster. Otherwise, the cluster is of sufficient size to be considered complete and processing branches to decision block 470 to determine the clustering process is to be terminated, if a new cluster is to be started or if the remaining transactions need to be assigned to the current cluster.

At block 492, the current cluster has not yet reached the cluster threshold. The first pair of geographic data objects is selected from the list sorted in descending order by the similarity function meeting the condition that one geographic data object of the pair is unassigned to a cluster and the other is assigned to the current cluster. Then, processing continues to loop among blocks 490 and 491 incrementally assigning new geographic data objects to the current cluster until the cluster achieves the cluster threshold.

The case in which the number of transactions remaining is less than or equal to the cluster threshold is now described starting with decision block 493.

In the loop represented by blocks 493 to 495, there are some geographic data objects that are unassigned, but the total number of transactions in the remaining geographic data objects is insufficient to populate another complete cluster. According to the present example, the remaining geographic data objects are processed in a single loop which runs through all the remaining geographic data objects and assigns them to the most similar clusters that are already complete.

At decision block 493, it is determined if the number of geographic data objects remaining to be processed is greater than or equal to one. If so, processing continues with block 494; otherwise the clustering process is complete.

At block 494, the first pair of geographic data objects is selected from the list sorted in descending order by the similarity function meeting the condition that one geographic data object of the pair is unassigned and the other is assigned to a cluster.

At block 495, the unassigned geographic data object of the selected pair is assigned to the cluster to which the other is assigned and processing continues with decision block 493 until all the remaining geographic data objects are assigned to clusters.

Figure 5A:
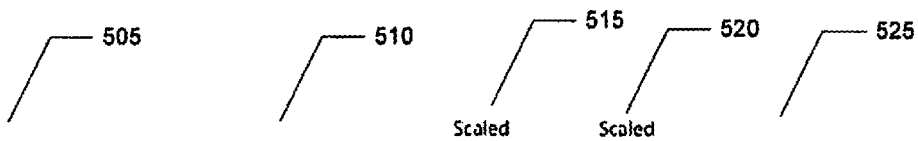
FIG. 5A depicts examples of geographic object data that illustrate a simplified example of clustering performed with the process of FIGS. 4A-4D, according to certain embodiments.

To further illustrate the clustering process illustrated by FIG. 4, a simplified, concrete example is provided below with reference to FIG. 5A. In FIG. 5A, twenty-six geographic data objects 505 (e.g., Census Tracts) are clustered to create twelve segments 510 each having at least one thousand five hundred transactions for the current clustering criterion (e.g., a particular property type). Each geographic data object 505 has a scaled value for two numerical attributes 515 and 520. It should be recognized that the clustering methodologies described herein may be used for any number of numerical attributes (examples of which are provided below); however, for sake of brevity, two attributes are used. In the attached Appendix, a step-by-step tracking is provided for various variables, e.g., total assigned geographic data objects, total remaining geographic data objects, total assigned transactions and total remaining transactions, which may be maintained in accordance with some embodiments.

Returning to the present example, each geographic data object 505 also has a number of transactions 525 associated with the current clustering criterion. In the present example, segment numbers are assigned to groups of transactions in the order that the segments are created. Depending upon the particular implementation unique segment IDs may be preferable.

Continuing with the current example, at block 410 all geographic data objects 505 are sorted by the number of transactions satisfying the specified clustering criterion. The result of this sort in descending order by transaction count is shown in FIG. 5B by list 526. As can be seen with reference to list 526, assuming the cluster threshold, e.g., minimum number of transactions in a segment, is 1500 for purposes of this example, geographic data objects I, M, E and Y each have a sufficient number of transactions meeting the specified clustering criterion to represent a complete segment.

Figure 5C:
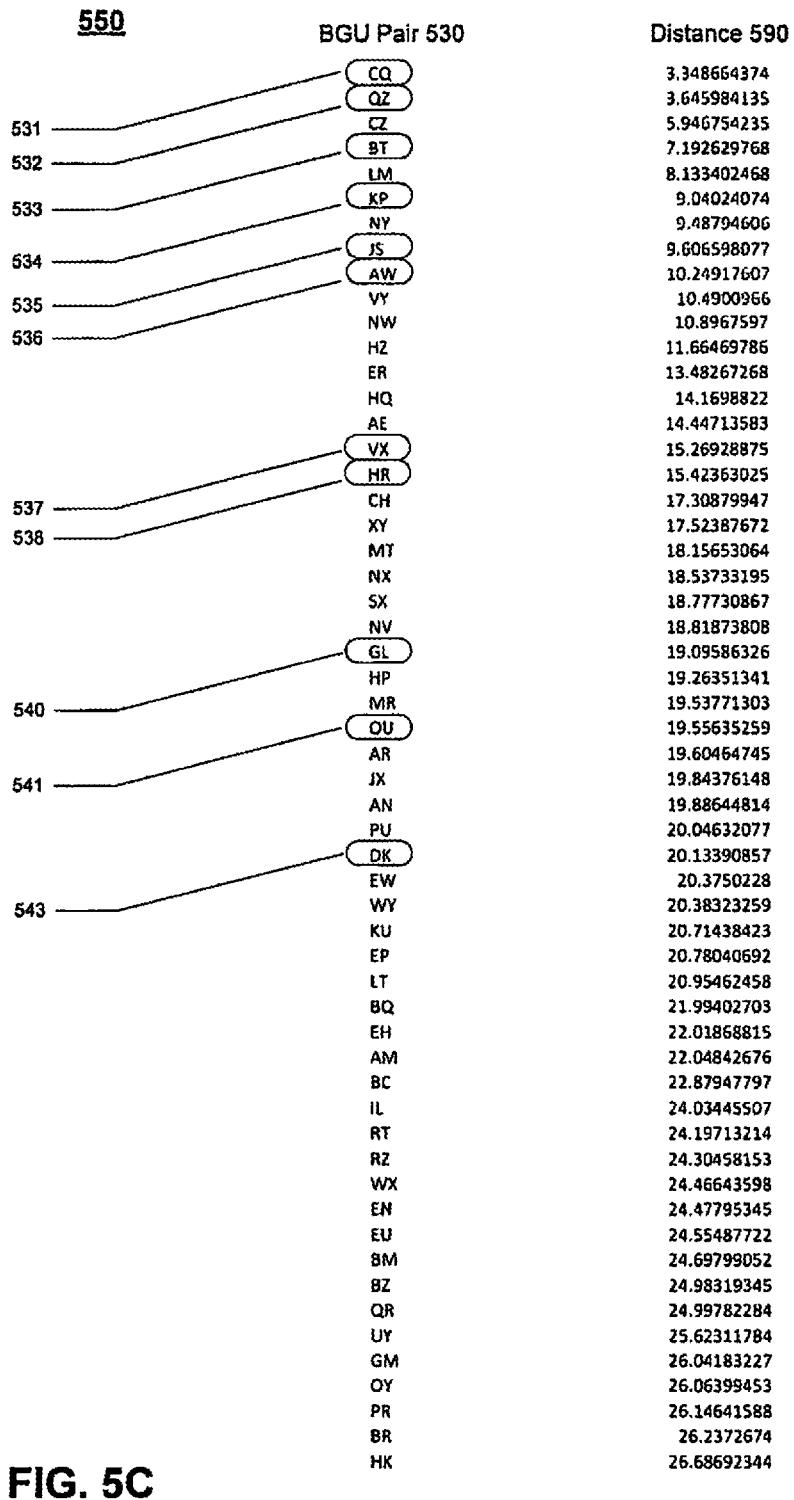
FIG. 5C depicts a portion of a partial list of geographic identifier pairs sorted in ascending order by a similarity function, according to certain embodiments.

At block 415, all possible pairs of geographic data objects are sorted by a similarity function. With 26 geographic data objects, the total number of pair combinations is 225. For the sake of brevity, a subset of the total possible pairs of geographic data objects 550 is presented in a list (spanning FIG. 5C and FIG. 5D), which represents the 75 geographic data object pairs having the smallest Euclidean distance in the 2-dimensional space represented by the two attributes 515 and 520.

According to the clustering process of FIG. 4, any unassigned geographic data object with transaction counts greater than the cluster threshold (in this example 1500) are initially assigned to their own segment. Thus, looking at list 526, it can be seen that the transactions of geographic data objects I, M, E and Y will be assigned to their own segments, segments 1, 2, 3 and 4, respectively.

According to the clustering process of FIG. 4, after the assignment of geographic data objects having transaction counts greater than the cluster threshold, a geographic data object pair is selected from the sorted list of geographic data object pairs 550 in which neither geographic data object of the pair has been assigned to a cluster. In the current example, this step would cause geographic data object pair CQ 531 to be selected and their transactions assigned to a new segment (segment 5).

Since the number of transactions for the current segment is less than the cluster threshold (i.e., 1500), another pair of geographic data objects is selected from the sorted list of geographic data object pairs 550 such that one geographic data object is unassigned and the other is assigned to the current cluster. In the present example, this would cause geographic data object pair QZ 532 to be selected (as Q is in the current cluster and Z is yet to be assigned). Z is then assigned to the current cluster and all the transactions in Z are assigned to the current segment (segment 5). At this point, the number of transactions associated with segment 5 is greater than the cluster threshold. Consequently, the current cluster is complete.

At this point in the clustering process, the number of unassigned geographic data objects remains greater than one and the total number of unassigned transactions is greater than the cluster threshold. Therefore in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair BT 533 being selected. Since geographic data objects B and T together have greater than 1500 transactions, they form a complete cluster and all of their transactions are assigned to a single segment (segment 6).

Again, at this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair KP 534 being selected. Since geographic data objects K and P together have greater than 1500 transactions, they form a complete cluster and all of their transactions are assigned to a single segment (segment 7).

Again, at this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair JS 535 being selected. Since geographic data objects J and S together have greater than 1500 transactions, they form a complete cluster and all of their transactions are assigned to a single segment (segment 8).

Again, at this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair AW 536 being selected. Since geographic data objects A and W together have greater than 1500 transactions, they form a complete cluster and all of their transactions are assigned to a single segment (segment 9).

Again, at this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair VX 537 being selected. Since geographic data objects V and X together have greater than 1500 transactions, they form a complete cluster and all of their transactions are assigned to a single segment (segment 10).

Again, at this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair HR 538 being selected, assigned to a cluster and their transactions assigned to a segment (segment 11).

Since the number of transactions for the current segment (segment 11) is less than the cluster threshold, another pair of geographic data objects is selected from the sorted list of geographic data object pairs 550 such that one geographic data object is unassigned and the other is assigned to the current cluster. In the present example, this would cause geographic data object pair LR 539 to be selected (as R is in the current cluster and L is yet to be assigned). L is then assigned to the current cluster and all the transactions in L are assigned to the current segment (segment 11). At this point, the number of transactions associated with the current segment (segment 11) is still less than the cluster threshold. Consequently, another pair of geographic data objects is selected from the sorted list of geographic data object pairs 550 such that one geographic data object is unassigned and the other is assigned to the current cluster. In the present example, this would cause geographic data object pair GL 540 to be selected (as L is in the current cluster and G is yet to be assigned). G is then assigned to the current cluster and all the transactions in G are assigned to the current segment (segment 11). At this point, the number of transactions associated with the current segment (segment 11) is greater than the cluster threshold. Consequently, the current cluster is complete.

At this point in the clustering process, the number of unassigned geographic data objects remains greater than one and the total number of unassigned transactions is greater than the cluster threshold. Therefore, in accordance with the clustering process of FIG. 4, a new cluster is started by selecting the first pair of geographic data objects from the sorted list of geographic data object pairs 550 such that neither geographic data object is already assigned to a cluster. According to the present example, this step results in geographic data object pair OU 541 being selected, assigned to a cluster and their transactions assigned to a segment (segment 12).

Since the number of transactions for the current segment (segment 12) is less than the cluster threshold, another pair of geographic data objects is selected from the sorted list of geographic data object pairs 550 such that one geographic data object is unassigned and the other is assigned to the current cluster. In the present example, this would cause geographic data object pair NU 542 to be selected (as U is in the current cluster and N is yet to be assigned). N is then assigned to the current cluster and all the transactions in N are assigned to the current segment (segment 12). At this point, the number of transactions associated with the current segment (segment 12) is greater than the cluster threshold. Consequently, the current cluster is complete.

At this point in the clustering process, the total unassigned transactions is less than the clustering threshold (i.e., there are not enough remaining transactions to build a complete segment). Therefore, the remaining geographic data objects (i.e., D and F), in accordance with the clustering processing of FIG. 4, are assigned to existing clusters and their transactions to existing segments.

The first occurrence of geographic data object D in the sorted list of geographic data object pairs 550 is selected in which the other geographic data object in the pair is already assigned. In the present example, this would cause geographic data object pair DK 543 to be selected (as K has already been assigned to a cluster and its transactions have already been assigned to a segment (segment 7)). D is then assigned to the cluster to which K was previously assigned and all the transactions in D are assigned to the segment (segment 7) to which K's transactions were previously assigned.

Next, the first occurrence of geographic data object F in the sorted list of geographic data object pairs 550 is selected in which the other geographic data object in the pair is already assigned. In the present example, this would cause geographic data object pair FO 544 to be selected (as O has already been assigned to a cluster and its transactions have already been assigned to a segment (segment 12)). F is then assigned to the cluster to which O was previously assigned and all the transactions in F are assigned to the segment (segment 12) to which O's transactions were previously assigned.

Finally, since the total unassigned transactions is now equal to zero and the unassigned geographic data objects equals zero, the clustering process to build segments for the current clustering criterion is complete.

Figure 5E:
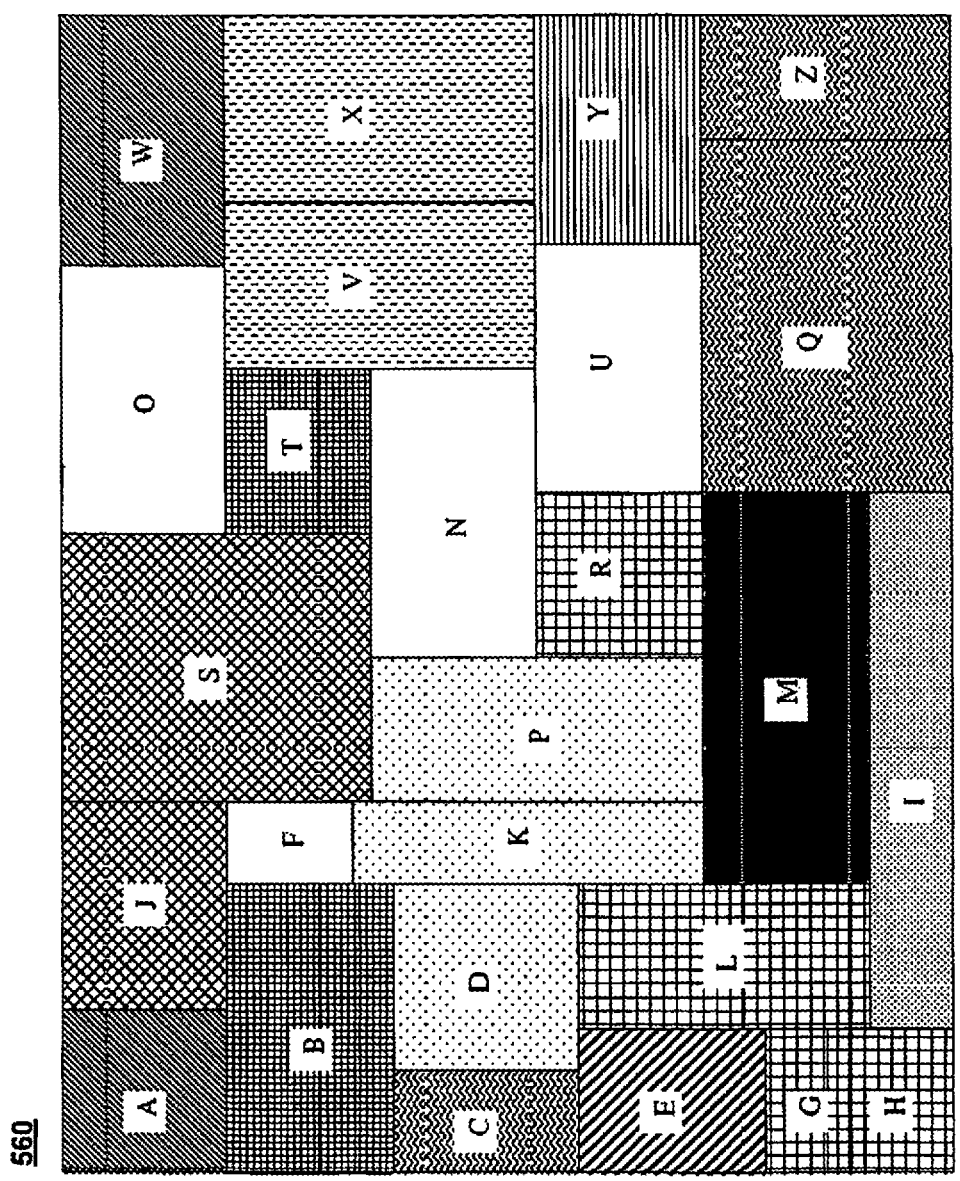
FIG. 5E graphically illustrates the results of the clustering process as applied to the sample data of FIG. 5A, according to certain embodiments.

FIG. 5E graphically illustrates the results of the clustering process as applied to the sample geographic object data of FIG. 5A in accordance with an embodiment. In the present example, a county 560 is divided into a number of geographic data objects (e.g., CTs). Based on their similarity and numbers of transactions meeting the clustering criterion, twelve clusters 565 of geographic data objects and twelve corresponding segments (segments 1-12) containing the transactions of the clustered geographic data objects have been created by the clustering processing of FIG. 4. In order to meet the desired cluster threshold of 1500 transactions per segment and based on the similarity of their attributes, geographic data objects C, Q and Z have been assigned to a cluster and all of their transactions have been assigned to a segment (segment 5). Similarly, geographic data objects B and T have been clustered to create segment 6, geographic data objects K, P and D have been clustered to create segment 7, geographic data objects J and S have been clustered to create segment 8, geographic data objects A and W have been clustered to create segment 9, geographic data objects V and X have been clustered to create segment 10, geographic data objects G, H, L and R have been clustered to create segment 11 and geographic data objects F, N, O and U have been clustered to create segment 12. Meanwhile, geographic data objects I, M, E and Y had a sufficient number of transactions to stand on their own as independent segments.

Notably, in the present example, clusters need not be geographically continuous in nature and clusters do not cross county boundaries. For example, in the cluster containing geographic data objects G, H, L and R, geographic data object R is not adjacent to any of the other geographic data objects in the cluster. In additional or alternative embodiments, the clustering processing of FIG. 4 may be modified to include a requirement that each geographic data object in a cluster is adjacent to at least one other geographic data object in the cluster. Meanwhile, to the extent counties can be relied on to track data regarding like attributes in a consistent manner, in additional or alternative embodiments, clusters could be allowed to include geographic data objects from more than one county.

Exemplary Numerical Attributes that May be Associated with Geographic Data Objects Depending upon the numerical modeling and/or analysis at issue, in addition to others, various of the following numerical attributes may be associated with geographic data objects:

ID
DATA
LONGITUDE
LATITUDE
County
State
Name
Population
Male
Female
Age <5
Age 5 to 9
Age 10 to 14
Age 15 to 19
Age 20 to 24
Age 25 to 34
Age 35 to 44
Age 45 to 54
Age 55 to 59
Age 60 to 64
Age 65 to 74
Age 75 to 84
Age 85+
Median Age
Age 18+
Male 18+
Female 18+
Age 21+
Age 62+
Age 65+
Male 65+
Female 65+
InHouseholds
InHH_Householder
InHH_Spouse
InHH_Child
InHH_Own Child_Age <18
InHH_Other Relatives
InHH_Other_Age <18
InHH_Nonrelative
InHH_Unmarried Partner
In group quarters
InGrp_Institutionalized
InGrp_Noninstitutionalized
Households
HH_Family
HH_Family_Own Child <18
HH_Family Married
HH_Family_Mar_Own_Child <18
HH_Female No Husband
HH_Female_Own Child <18
HH_Nonfamily
HH_Non_Living Alone
HH_Non_Alone_HHer 65+
HH_People <18
HH_People 65+
Average HH Size
Average Family Size
Housing Units
HU_Occupied
HU_Vacant
VacHU_For Seasonal Use
Owner Vacancy Rate
Rental Vacancy Rate
OccHU_Owner Occupied
OccHU_Renter Occupied
OccHU_Own_Avg HH Size
OccHU_Rent_Avg HH Size
In school 3+
In Sch_Nursery/preschool
In Sch_Kindergarten
In Sch_Elementary
In Sch_High school
In Sch_College/grad school
Population 25+
25+.sub.--<9th grade
25+.sub.--9th to 12th grade no diploma
25+_High school grad
25+_Some college no degree
25+_Associate degree
25+_Bachelor's degree
25+_Grad or prof degree
25+_% HS grad or higher
25+_% bachelor's degree or higher
Population 15+
15+_Never married
15+_Now married
15+_Separated
15+_Widowed
15+_Widowed_Female
15+_Divorced
15+_Divorced_Female
Grandparent in HH_w/own grandchild <18
Grandparent resp for grandchildren <18
Civilian 18+
Civilian 18+_Veterans
Population 5-20
Population 65+
Population 5+
5+_Same house in 1995
5+_Different house in 1995
5+_Diff_hse_Same county
5+_Diff_hse_Diff county
5+_Diff_hse_Diff co_Same state
5+_Diff_hse_Diff co_Diff state
5+_Elsewhere in 1995
Population 16+
16+_In labor force
16+_In LF_Civilian
16+_In LF_Civilian-Employed
16+_In LF_Civilian_Unemployed
16+_In LF_Civilian_Unempl_%
16+_In LF_Armed Forces
16+_Not in labor force
Females 16+
Fem 16+_In labor force
Fem 16+_In LF_Civilian
Fem 16+_In LF_Civilian_Employed
Own children <6
Own child <6_All parents in LF
Workers 16+

16+_Mode: Car_Drove alone
16+_Mode: Car_Carpooled
16+_Mode: Public trans
16+_Mode: Walked
16+_Mode: Other means
16+_Mode: Worked at home
16+_Mean travel time to work
Employed civilian population 16+
EC 16+_Occ: Manage/prof
EC 16+_Occ: Service
EC 16+_Occ: Sales/office
EC 16+_Occ: Farming/fishing/forestry
EC 16+_Occ: Constr/extract/maint
EC 16+_Occ: Prod/transp/material
EC 16+_Ind: Ag/forestry/fishing/mining
EC 16+_Ind: Construction
EC 16+_Ind: Manufacturing
EC 16+_Ind: Wholesale trade
EC 16+_Ind: Retail trade
EC 16+_Ind: Transportation/warehousing
EC 16+_Ind: Information
EC 16+_Ind: Finance/ins/RE/rental
EC 16+_Ind: Prof/scientific/admin
EC 16+_Ind: Ed/health/soc services
EC 16+_Ind: Art/entertain/rec/acc/food
EC 16+_Ind: Other (ex public admin)
EC 16+_Ind: Public administration
EC 16+_Workers: Private wage/salary
EC 16+_Workers: Government
EC 16+_Workers: Self-employed
EC 16+_Workers: Unpaid family
Households (LF)
HH_Income <$10K
HH_Income $10K-14999
HH_Income $15K-24999
HH_Income $25K-34999
HH_Income $35K-49999
HH_Income $50K-74999
HH_Income $75K-99999
HH_Income $100K-149999
HH_Income $150K-199999
HH_Income $200K+
HH_Median income
HH_w/earnings
HH_w/earnings_Mean earnings
HH_w/Social Security income
HH_w/SS_Mean income
HH_w/Supplemental Security Income
HH_w/SSI_Mean income
HH_w/public assistance income
HH_w/PA_Mean income
HH_w/retirement income
HH_w/ret_Mean income
Families (LF)
Fam_Inc: <$10K
Fam_Inc: $10K-$14999
Fam_Inc: $15K-$24999
Fam_Inc: $25K-$34999
Fam_Inc: $35K-$49999
Fam_Inc: $50K-$74999
Fam_Inc: $75K-$99999
Fam_Inc: $100K-$149999
Fam_Inc: $150K-$199999
Fam_Inc: $200K+
Fam_Median family income
Fam_Per capita income
Fam_Median earnings_Male FT
Fam_Median earnings_Female FT
Below pov lev: Families
Below pov lev: Fam-w/rel child <18
Below pov lev: Fam-w/rel child <5
Below pov lev: Fam w/fem Hher no husb
Below pov lev: Fem HHer_rel child <18
Below pov lev: Fem HHer_rel child <5
Below pov lev: Individuals
Below pov lev: Indiv.sub.--18+
Below pov lev: Indiv.sub.--65+
Below pov lev: Indiv_Rel child <18
Below pov lev: Indiv_Rel child 5-17
Below pov lev: Indiv_Unrelated 15+
Pov stat det: Families
Pov stat det: Fam-w/rel child <18
Pov stat det: Fam-w/rel child <5
Pov stat det: Fam w/fem Hher no husb
Pov stat det: Fem HHer_rel child <18
Pov stat det: Fem HHer_rel child <5
Pov stat det: Individuals
Pov stat det: Indiv.sub.--18+
Pov stat det: Indiv.sub.--65+
Pov stat det: Indiv_Rel child <18
Pov stat det: Indiv_Rel child 5-17
Pov stat det: Indiv_Unrelated 15+
HU.sub.--1 unit detached
HU.sub.--1 unit attached
HU.sub.--2 units
HU.sub.--3-4 units
HU.sub.--5-9 units
HU.sub.--10-19 units
HU.sub.--20+units
HU_Mobile home
HU_Boat/RV/van
HU_Built 1999-March 2000
HU_Built 1995-1998
HU_Built 1990-1994
HU_Built 1980-1989
HU_Built 1970-1979
HU_Built 1960-1969
HU_Built 1940-1959
HU_Built 1939 or earlier
HU.sub.--1 room
HU.sub.--2 rooms
HU.sub.--3 rooms
HU.sub.--4 rooms
HU.sub.--5 rooms
HU.sub.--6 rooms
HU.sub.--7 rooms
HU.sub.--8 rooms
HU.sub.--9+rooms
HU_Median rooms
OccHU_Moved in: 1999-March 2000
Occ HU_Moved in: 1995-1998
Occ HU_Moved in: 1990-1994
Occ HU_Moved in: 1980-1989
Occ HU_Moved in: 1970-1979
Occ HU_Moved in: 1969 or earlier
Occ HU_No vehicles
Occ HU.sub.--1 vehicle
Occ HU.sub.--2 vehicles
Occ HU.sub.--3+vehicles
Occ HU-Utility gas
Occ HU_Bottled/tank/LP gas
Occ HU_Electricity
Occ HU_Fuel oil/kerosene
Occ HU_Coal/coke Occ HU_Wood
Occ HU_Solar energy
Occ HU_Other fuel
Occ HU_No fuel used
Occ HU_Lacking complete plumbing
Occ HU_Lacking complete kitchen
Occ HU_No telephone service
Occ HU_Occ/room: 1 or less
Occ HU_Occ/room: 1.01-1.5
Occ HU_Occ/room: 1.51+
Specified owner-occupied units
Sp own-occ_Value: <$50K
Sp own-occ_Value: $50K-99999
Sp own-occ_Value: $100K-149999
Sp own-occ_Value: $150K-199999
Sp own-occ_Value: $200K-299999
Sp own-occ_Value: $300K-499999
Sp own-occ_Value: $500K-999999
Sp own-occ_Value: $1000000+
Sp own-occ_Value: Median
Sp own-occ_With a mortgage
Sp own-occ_w/mortgage <$200
Sp own-occ_w/mortgage_$200-499
Sp own-occ_w/mortgage_$500-699
Sp own-occ_w/mortgage_$700-999
Sp own-occ_w/mortgage_$1K-1499
Sp own-occ_w/mortgage_$1.5K-1999
Sp own-occ_w/mortgage_$2K+
Sp own-occ_Median cost
Sp own-occ_Not mortgaged
Sp own-occ_Not mort_Median cost
Sp own-occ_Costs <15% of HH inc
Sp own-occ_Costs 15-19% of HH inc
Sp own-occ_Costs 20-24.9% of HH inc
Sp own-occ_Costs 25-29.9% of HH inc
Sp own-occ_Costs 30-34.9% of HH Inc
Sp own-occ_Costs 35+% of HH Inc
Sp own-occ_Costs_Not computed
Specified renter-occupied units
Sp rent-occ_Rent <$200
Sp rent-occ_Rent $200-299
Sp rent-occ_Rent $200-499
Sp rent-occ_Rent $500-749
Sp rent-occ_Rent $750-999
Sp rent-occ_Rent $1000-1499
Sp rent-occ_Rent $1.5K+
Sp rent-occ_No cash rent
Sp rent-occ_Median rent
Sp rent-occ_Rent <15% of HH Inc
Sp rent-occ_Rent 15-19.9% of HH Inc
Sp rent-occ_Rent 20-24.9% of HH Inc
Sp rent-occ_Rent 25-29.9% of HH Inc
Sp rent-occ_Rent 30-34.9% of HH Inc
Sp rent-occ_Rent 35+% of HH Inc
Sp rent-occ_Rent not computed Additional Exemplary Numerical Attributes that May be Associated with Geographic Data Objects Depending upon the numerical modeling and/or analysis at issue, the following additional attributes may also be associated with geographic data objects. However, in various contexts, such as in connection with making lending decisions by lending institutions, it may be desirable to exclude use of the following numerical attributes to obviate any inference of redlining.

1 Race
White
Black
AmIndian
Asian
Asn_Asian Indian
Asn_Chinese
Asn_Filipino
Asn_Japanese
Asn_Korean
Asn_Vietnamese
Asn_Other Asian
Hawaiian
Hwn_Native
Hwn_Guamanian
Hwn_Samoan
Hwn_Other PI
Other Race
2+ Races
AP White
AP Black
AP AmIndian
AP Asian
AP Hawaiian
AP_Other
AP_Hispanic Origin
H_AP Mexican
H_AP Puerto Rican
H_AP Cuban
H_AP Other
Not Hispanic
NH_White
21-64_w/disability_% employed
21-64_No disability
21-64_No disability_% employed
65+_w/disability
Native
Native_Born in US
Native_Born in US_Res State
Native_Born in US_Diff State
Native_Born outside US
Foreign
Foreign_Entered 1990-March 2000
Foreign_Naturalized citizen
Foreign_Not a citizen
Foreign born (ex born at sea)
Foreign_Europe
Foreign_Asia
Foreign_Africa
Foreign_Oceania
Foreign_Latin America
Foreign_Northern America
5+_English only
5+_Other language
5+_Other lang_Engl <very well
5+_Other lang_Spanish
5+_Other lang_Sp_Engl <very well
5+_Other Indo-European
5+_Other lang_Indo-Eur Engl <very well
5+_Other lang_Asian and Pacific Island
5+_Other lang_API_Engl <very well
Total ancestries reported
Ancestry_Arab
Ancestry_Czech
Ancestry_Danish
Ancestry_Dutch
Ancestry_English
Ancestry_French (ex Basque)
Ancestry_French Canadian
Ancestry_German Ancestry_Greek
Ancestry_Hungarian
Ancestry_Irish
Ancestry_Italian
Ancestry_Lithuanian
Ancestry_Norwegian
Ancestry_Polish
Ancestry_Portuguese
Ancestry_Russian
Ancestry_Scotch-Irish
Ancestry_Scottish
Ancestry_Slovak
Ancestry_Subsaharan African
Ancestry_Swedish
Ancestry_Swiss
Ancestry_Ukrainian
Ancestry_US or American
Ancestry_Welsh
Ancestry_West Indian (ex Hisp)
Ancestry_Other ancestries 5-20_w/disability 21-64_w/disability

Having now described various clustering methodologies, provided examples of various numerical attributes and walked through a simple concrete example, use of the clustered real estate transaction data in the context of exemplary numerical modeling and/or analysis (e.g., estimating real property valuations) will now be described.

In some embodiments, a real property valuation process begins when a case, consisting of a property data record, is initiated by a user as a request for valuation. The request might include any data that uniquely identifies the desired property including, for example, the street address, city, state and ZIP Code, or the assessor's parcel number or the name of the owner and the city, state and ZIP Code, or the owner and ZIP Code.

If the case is part of a list (batch) of such requests submitted at the same time, then each property on the list can have a user defined unique identifier to assist the user in identifying individual cases in the output report. In some embodiments, these requests can be initiated from outside the system using a World Wide Web based user interface, UI, which is only accessible by means of a login.

After completing the login by entering a username and password, the user may be directed to a page that allows initiation of a case and is presented with a number of tabs including in this embodiment "Find", "My Work", "Batch Jobs", "Advanced", "Search", "Admin", "iMVI" and "Alerts", access to each of these tabs require a set of permissions that are administered within the functionality of the "Admin" tab.

Figure 6:
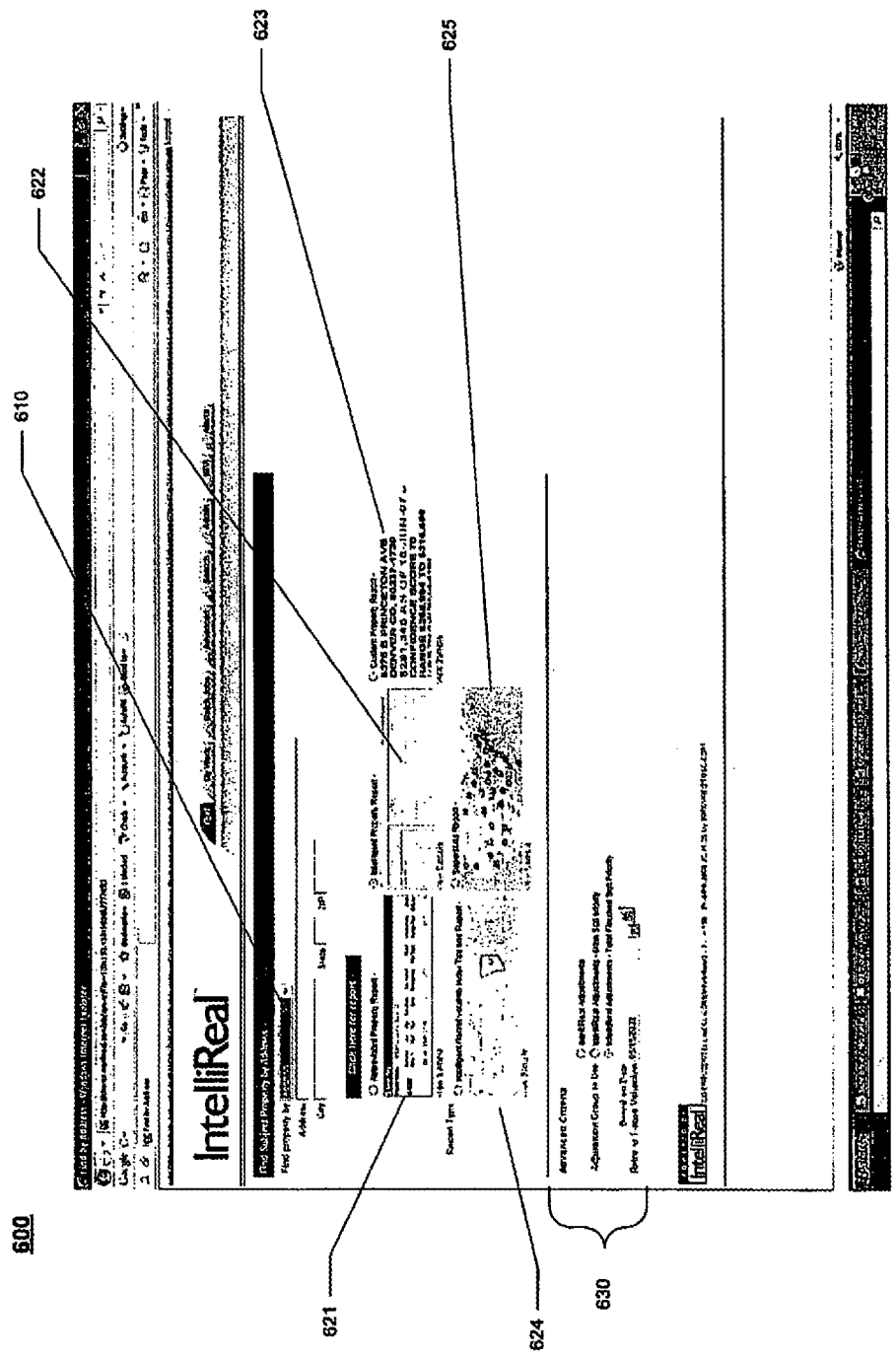
FIG. 6 depicts an example of a user interface that may assist with property record identification, according to certain embodiments.

For purposes of providing an understanding of the valuation process, the "Find" tab, shown in FIG. 6 is described. FIG. 6 is a user interface screen shot of a page 600 that may assist with property identification in accordance with an embodiment. According to the present example, the user can select the method of property identification from among, "Address", "Owner" or "House Number and Street Name" by means of a drop down select box 610. Each selection updates the page 600 with fill in boxes appropriate to the method selected by the user. The method selected for illustration is the "Address" method. The user enters the street address, including unit number, if required to uniquely identify the property, the city, state and ZIP Code. If the information is incomplete the system can nevertheless still process the request as long as enough information is provided. The user can also select a number of reports including "Abbreviated Property Report" 621, "Intelligent Property Report" 622, "Custom Property Report" 623, "Intelligent Market Volatility Index" 624 or "Superstats Report" 625. Each of these selections provides information about the case initiated. In the "Advanced Criteria" area 630 the user can also select from among a number of adjustment schemes appropriate to the needs of the user of the user together with the past, present or future date of the value of the property. For purposes of this example, an "Intelligent Property Report" is requested using the "IntelliReal Adjustments—Total Finished Sqft Priority" and May 15, 2008 as the "Based on Date Retro or Future Valuation" entry.

After the report is initiated the database calculates a valuation and assembles a default set of statistics, charts, maps, lists of comparable properties with adjustments, etc. One possible output exemplary among various possible outputs is shown by FIG. 7.

FIG. 7 is an Intelligent Property Report 700 for a subject property in accordance with an embodiment. In the present example, only a portion of the report is shown for illustration. Information included in the report includes:

Report information including the Subject Property standardized address, the Creation Date of the report, the As of Date of the valuation;

Subject Valuation information including the Estimated Value of the Subject Property the Confidence Score of the valuation, a confidence interval represented as the range of values that the bracket the Estimated Value at a displayed confidence level, the Estimated Value Change in the Last Year and the Future Quarter.

A table of Comparable Property Sales side-by-side with the subject showing the Distance between the subject and each comparable property, the Subdivision Names, the Value History of each property including Time-adjusted Value, Total Adjustment, Last Sale Price, Last Sale Date, Seller Concession, Prior Sale Price, Prior Sale Date, MLS List Price, MLS List Date, Days on Market, PSF (Current), PSF (list), and Assessor Details including: Tax Value, Year, Land Value, and Property Improvements; Property Details including Style information including: Property Type, Design Style, Stories, Manufactured, Number of Units; Interior Details including: Finished SqFt, Basement SqFt, Bsmt Fnsh SqFt, Bedrooms, Bathrooms; Exterior including: Lot Size (acres), Amenities including: Fireplaces, Pool; Garage information including: Garage Spaces, Garage Type; Year Built, Owner.

Neighborhood Area Intel, segment data including: Total Property Count; and Area Analysis including: Property Sales Count, Percent Company Owned, Percent Non-Owner Occupied; a table showing Subject, Min, Avg, and Max statistics including: Sales Price, Main Sq Ft, Year Built, Lot Area, Price per Sq Ft, Bedrooms, Bathrooms, Basement Sq Ft, Basement Finished Sq Ft for the Neighborhood (segment); and an Area Sales Chart showing sales over time by prices as a scatter plot.

Area Map With Subject & Comps, which is displayed on an area street or hybrid map the location of the Subject Property and each of the comparable properties.

IMVI Chart—Median Price Movement for the Segment, County, MSA, State, and the Nation showing indexed trend lines for each.

This is followed by an "Area Recent Sales: Summary Information" that lists all nearby sales over the past year and property details including a list position number, Address, Distance (miles), Sale Price, Sale Date, Main Sqft, Lot Size, Bedrooms, Bathrooms, Year Built and Property Style for each. This is followed by another map which shows each of the sales in the list in its proper location relative to the Subject Property as an icon with the list position number in the center.

In some embodiments, the actual reports displayed on the exemplary "Intelligent Property Report" are user customizable from a dropdown table in on the report page. The choices include: IPR, Area Recent Sales Report (with map), Comp Stats Report, MLS Details Report, Active Area Listings Report (with map), Competitive Market Climate Report (Saturation Report), Neighborhood Stats Report, Nearby Sales Report (with map), Market Summary Report.

In additional or alternative embodiments, the primary method of customer data delivery may be by means of data feeds that are fully customized to client needs.

A high level description of the process of delivering a valuation follows: The property address, for example, is checked to assure that the input information includes a combination of inputs that might allow identification of a property. If the address information does not meet minimum requirements the process terminates with a warning. If the input address meets minimum requirements, it is parsed and the street address, city, state, and ZIP information is completed, if incomplete. Completion consists of finding the ZIP from the city and street information, if the ZIP is missing, or finding the city and/or state information if the city and/or state is missing. This is accomplished by looking up the data in USPS supplied tables. Then, the address is standardized. Standardization first identifies and arranges the address elements in the preferred USPS format and converts pre-directionals and post-directionals (like North) to USPS preferred (like N) and street types (like Avenue) to USPS preferred abbreviations (like AVE). For example 123 North Main Street W Apartment 23, Anytown, Washington would be corrected to 123 N Main St W APT 23, Any Town, WA 99016. The next step is to look up the street address and find a range of addresses that contain the subject address within the ZIP Code within USPS table of address ranges. A successful search allows the assignment of a ZIP four-digit add on. The exemplary address then becomes 123 N Main St W APT 23, Anytown, WA 99016-3221. A succession of iterative searches is sometimes necessary when misspellings of address components and mismatches between city and ZIP are encountered. Once the ZIP+4 Code is appended to the address then the standardized corrected address is compared to the USPS DPV database of deliverable address to find an exact match of street number and if included unit number. If there is no exact match the system takes action based upon the input of the user. The user can choose that a valuation is not returned or that the nearest match is valued or that only neighborhood report information is returned without a valuation.

If the input address is successfully verified, then the input corrected standardized address is found in the system master address file by searching for exact matches with the corrected standardized addresses in the master address file. If the search is successful, the process continues, user settings can allow the data from the closest match to be used.

Once the input address is matched, it is assigned the same primary key as the matched address. This primary key can be used to link to all data in the warehouse concerning the input subject property.

The data structure is in continuous operation receiving new data from multiple of sources, transforming and loading the data, testing data integrity, correcting and standardizing addresses, adding new addresses, merging new data with old in individual records, adding records, training and retraining models, testing models, calculating supervisory statistics, geocoding, clustering and segmenting, valuing properties, calculating and capturing the resulting valuations, creating historical records and trends, archiving data and so forth. In some embodiments, when a valuation is requested, the subject property identified reports, including valuations and ancillary report statistics, are already calculated and only need to be assembled in the desired format.

Example Use Case

In some embodiments, the automated modeling methods described herein can provide improvements for predicting transfer prices or other exchange attributes values. For instance, automated modeling methods that lack the features described herein are unable to produce the most precise and accurate results when very large numbers of categorically and numerically measured attributes are presented for pattern recognition. The performance of modeling engines is much enhanced by the identification of homogeneous segments relative to as many attributes as possible, because this allows a reduction in the number of variables that must be simultaneously processed. This is universal in the field of model discovery not limited to the sub-field of creating models for predicting real property transfer values.

One problem, or objective, therefore is to devise a method of grouping many millions of real properties into segments in such a way that many attributes affecting price can be held constant within each segment while those same attributes vary from segment to segment. This minimizes the difficulty of identifying the influence that each remaining variable attribute has within each segment facilitating the creation of an accurate and precise predictive model.

There are virtually no identical real properties. Even those that are of identical design and construction are situated on different parcels of land and have at least slightly different attributes that could be thought to affect the value, and over time maintenance and modifications accumulate such that the values diverge. There are, however, recognized classes of properties, property types that systematically command differing hedonic component values. For example the value of one square foot of heated floor area is demonstrably different, all else held constant, for a detached single family dwelling than for attached single family dwelling or a condominium.

The probable transfer price of a real property varies from place to place in the sense that raw land commands a different price per unit of area in one locale than in another and that an identical improvement transported from land in one locale to another will also command a different price. The distance between one locale and another can be quite small relative to the change in price and the locales and the price gradient is discontinuous. Therefore variation in transfer price given identical real property is based in large part upon the attributes of the locale in which the real property is situated.

The attributes of locales that affect the values of the real properties situated within them can be either be statistically characterized or are common throughout entire areas. Examples of these attributes might be school district, tax rates, proximity to shopping, transportation, jobs, the economic environment, median house price, etc. For the prediction of real property values, which are locale dependent as mentioned earlier, the most efficient segmenting method would be based upon both property type and locales composed of geographic base units with well-defined size and location relative to important physical and political divisions, and having known homogeneous social, economic, and demographic attributes.

It is theoretically better to have the locales as small as possible, but pattern recognition (modeling) considerations demand that a sufficient number of examples be available to fully disclose how changing attributes affect pricing patterns. This means that after a base geographic unit meeting the conditions above is selected a method of clustering the most similar units to produce geographic segments holding a sufficient number of transactions of the same property type should be devised.

Real property records compiled by county assessors and recorders are the primary available data source of data available for creating these predictive models. Since these records can be viewed as a number of separate data sets equal to the number of counties or other data collecting entities, segments may be constructed so that they are not cut by county or other entity boundaries. For some implementations, this implies a preference for geographic base units that are not cut by county lines, and since real property to be modeled covers the entire geography so should the collection of all base geographic units cover the complete geography to be modeled.

Since collections of similar base geographic units are required, the statistical attributes used to compare the base geographic units should be universally available as well as consistently collected and computed.

In short, an existing problem in the field of automated property valuation methodologies is to identify the best geographic base unit and devise a method a clustering these base units based upon a definition of similarity and to select the smallest possible geographic area while identifying clusters of geographic base units containing a sufficient number of example transactions to satisfy the requirements of modeling.

While existing methods of grouping real property transactions use USPS ZIP Code as the base geographic unit, ZIP Codes are in some cases inadequate as base geographic units because they are not created for statistical purposes. ZIP Codes are not delineated to be statistically homogeneous, statistics are not consistently collected about them, they cross county lines, and they change continuously. On the other hand, Census Tracts are created and delineated primarily for statistical purposes, are demographically, economically, and socially homogeneous and of nearly equal population, extensive statistics are consistently collected and published for the express purpose of comparing one to another, and they change not more often than once per decade.

Various embodiments are described herein for applying automated modeling algorithms. In some embodiments, the automated modeling algorithm may compute a predicted exchange attribute value for a target property record (e.g., estimating an appropriate transfer price of a real property, generating one or more price indices or trend lines for a set of target property records) by applying one or more automated real property valuation models to a segment of the relatively homogeneous segments with which one or more target property records are associated.

In one example, the automated modeling algorithm is used to estimate an appropriate transfer price or other exchange attribute value of a real property. To train the automated modeling algorithm records describing real property transactions are received. Each described real property transaction is assigned to appropriate geographic identifier or data objects or data objects (e.g., base geographic units) based on a physical location of a real property associated with the real property transaction and statistical information about the geographic identifier or data objects or data objects or defined agglomeration of the geographic identifier or data objects or data objects, where the statistical information is either derived from the property records or gathered from other sources. The information regarding the physical location of the real property associated with the real property transaction may include multiple attributes of the physical location. In some embodiments, a geographic identifier or data object having a number of real property transactions meeting or exceeding a sufficient size (i.e., a threshold number of a segment) can be assigned an individual clusters.

In this example, multiple relatively homogeneous segments of transactions (e.g., real property transactions) are built by aggregating one or more of the geographic identifier or data objects or data objects into clusters based on application of a similarity function among corresponding numerically valued attributes associated with the geographic identifier or data objects or data objects. The aggregation causes each of the relatively homogeneous segments to have a sufficient size to facilitate one or more of accuracy and precision of an automated modeling algorithm (e.g., one or more automated real property valuation models.) Finally, an appropriate transfer price of a real property of interest is estimated by applying the one or more automated real property valuation models to a segment of the relatively homogeneous segments with which the real property of interest is associated.

In some embodiments, a list of all possible pairs of geographic identifier or data objects or data objects could be created and sorted by a similarity function. Pairs of the geographic identifier or data objects or data objects from the sorted list may be assigned to the clusters. Examples of a similarity function include a Euclidean distance function and a Mahalanobis distance function.

Examples of geographic units indicated by geographic identifier or data objects or data objects include Census Tracts, Unites States Postal Service ZIP Codes, ZIP+2 codes, ZIP+4 codes, regions, states, counties, school districts or synthetically generated grids. In some embodiments, the geographic identifier or data objects or data objects may be created for statistical purposes and statistics are consistently collected regarding the plurality of geographic identifier or data objects or data objects. In some embodiments, the geographic identifier or data objects or data objects may include geographically discontinuous Census Tracts. In other embodiments, clusters may be created in which no cluster includes Census Tracts from more than one county.

Some embodiments provide other real property valuation methodologies. Information is received regarding real property transactions. Each real property transaction is assigned to an appropriate geographic identifier or data object based on information regarding a physical location of a real property associated with the real property transaction. For each property type represented in the real property transactions, relatively homogeneous segments of sufficient size are created to facilitate one or more of accuracy and precision of one or more automated real property valuation models by aggregating one or more of the geographic identifier or data objects or data objects into clusters by applying a predetermined similarity function among corresponding numerically valued attributes of the geographic identifier or data objects or data objects. An appropriate transfer price of a real property of interest can be estimated by applying the one or more automated real property valuation models to a segment of the relatively homogeneous segments with which the real property is associated.

Some embodiments provide yet other real property valuation methodologies. Information is received regarding real property transactions. A set of segmented real property transaction data is formed by grouping the real property transactions into segments based on a function of one or more attributes associated with the real property transactions. Each real property transaction of the set of segmented real property transaction data is assigned to an appropriate geographic identifier or data object based on information regarding a physical location of a real property associated with the real property transaction. A set of segmented and clustered real property transaction data is formed by grouping the geographic identifier or data objects or data objects into clusters by applying a predetermined similarity function among corresponding numerically valued attributes of the geographic identifier or data objects or data objects on a segment-by-segment basis and requiring each of the segments of clusters to have at least a predetermined minimum number of clustered elements which is defined to facilitate one or more of accuracy and precision of one or more automated real property valuation models. Then, an appropriate transfer price of a real property associated with one of the clusters may be estimated by applying the one or more automated real property valuation models to the set of segmented and clustered real property transaction data.

In the context of various of the aforementioned embodiments, preprocessing the information regarding real property transactions may involve establishing the predetermined minimum number of clustered elements by making models on successively smaller sets of training data to determine a size at which the accuracy or the precision of the one or more automated real property valuation models begins to degrade; identifying suitable transactions by scrubbing the set of example transactions to exclude non-free market transactions; assigning each of the suitable transactions to a correct Census Tract; storing statistical data regarding each Census Tract by collecting, weighting and scaling data regarding the suitable transactions; and for every county and every possible pair of Census Tracts within the county, calculating and recording the predetermined similarity function based on the statistical data.

In the context of various of the aforementioned embodiments, the predetermined similarity function may be a Euclidean distance. In the context of various of the aforementioned embodiments, the predetermined similarity function may be Mahalanobis distance.

Terminology

The phrases "base geographic unit," "geographic data object," "base geographic element" and "base geographical element" generally refer to a definable geographical areas. Examples of base geographic units include, but are not limited to census blocks, census block groups, census tracts, counties, states, school districts, Metropolitan Statistical Areas (MSAs), ZIP Codes, ZIP+2, ZIP+4 codes, or synthetically generated grids, which may or may not overlap, and the like.

The term "cluster" generally refers to a grouping of objects of a dataset having numerically valued and/or statistically valued attributes and a predetermined similarity among the attributes as measured by a particular similarity function, such as Euclidean distance among corresponding attributes. In some embodiments, real properties are associated with clusters and each cluster represents a collection of base geographic entities that are grouped together based upon similarity of attributes of the base geographic entities.

In some embodiments, attributes associated with the base geographic entities are numerical attributes representing similarity statistical data, such as that collected by the Census Bureau. In some embodiments, base geographic units having known homogeneous social, economic, and demographic attributes are clustered to produce segments holding a sufficient number of real property transactions of the same property type. In some embodiments, the base geographic units may be ZIP Codes, Metropolitan Statistical Areas (MSAs) or a geographic base unit providing more granularity than MSAs, such as Census Tracts or the like. Depending upon the particular implementation, clusters may be continuous or discontinuous. In some embodiments, each base geographic entity within a cluster may be required to be adjacent to another. In other embodiment, adjacency to another base geographic entity within the cluster is not a prerequisite to association with a cluster.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with another. Based on the disclosure provided herein, one of ordinary skill in the art will appreciate a variety of ways in which connection or coupling exists in accordance with the aforementioned definition.

The phrase "Corrected Assessor Model" or the acronym "CAM" generally refer to a method of extracting and tuning the county or state assessment ratio, the function relating the assessor's full market value assessment to the assessed value. In some embodiments, CAM is a computational methodology that automatically extracts the assessment ratio from a segment of data thus allowing valuations to be extracted from county assessor valuations.

The phrase "Corrected Trend Model" or the acronym "CTM" generally refer to a method of generating indices for each segment and time shifting transaction values relative to the generated indices. In some embodiments, CTM is a computational methodology that generates price indices for each segment, establishes each transaction's value relative to the generated trend line and allows the correction of a transaction value to past or future time (time shifting).

The phrase "Expert System" or the acronym "ES" generally refer to a comparable sales methodology that uses appraiser best practices to generate valuations either unsupervised or with appraiser supervision. In some embodiments, ES is a computational embodiment of professional appraiser best practice using "Comparable Sales Methodologies" that infer the value of a subject property by referring to transaction values for nearby identical properties; when property attributes are not identical the property is treated as a collection of valued attributes (differentiated good) that together sum to the total value of the property thus allowing for valuation corrections based upon attribute differences.

The phrases "in some embodiments" and the like generally mean the particular feature, structure, or characteristic following the phrase is included in at least one embodiment, and may be included in more than one embodiment. Importantly, such phases do not necessarily refer to the same embodiment.

The acronym "KARL" generally refers to a computational embodiment of linear and/or non-linear piecewise regression on transaction values of segmented properties and their associated attribute data that determines the hedonic value of the individual attributes; weightings determined by KARL provide input to ES that improves valuation adjustments based upon attribute differences.

If the specification states a component or feature "may", "can", "could", or "might" be included or have a characteristic, that particular component or feature is not required to be included or have the characteristic.

The term "responsive" includes completely or partially responsive.

The term "segment" generally refers to another form of grouping of objects of a dataset. In some embodiments, a segment represents a collection of transactions for a particular value of a clustering function (e.g., property type, transaction type or combination of attributes) relating to real properties residing within one or more homogeneous clusters. In some embodiments, real property transaction information includes numerically and/or categorically valued attributes. In some embodiments, segments having sufficient number of transactions are built by clustering groups of one or more base geographic units together and assigning the transactions within such clusters to appropriate segments. In some embodiments, agglomerations of geographic data objects are created based on attribute similarity to construct appropriately sized segments of real property transactions for one or more values of a clustering function (e.g., a function based on attributes associated with the real property transactions, such as property type, property style, price tier and the like, individually or in combination). The segmented transactions may then be used to develop models that can be applied for the purpose of valuing properties, creating indices, generating trend lines and the like. In some embodiments, a segment represents a grouping of real property transactions based on one or more attributes associated with the transaction and/or the real property at issue. In some embodiments, real property valuation estimation involves analysis of appropriately segmented real property transaction data built by clustering homogeneous sets of Census Tracts.

GENERAL CONSIDERATIONS

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

The invention claimed is:

1. A system comprising:
a communication interface configured for establishing, via one or more data networks, a plurality of connections to a plurality of property data providers and a data connection to a client computing device;
a non-transitory computer-readable medium having a database that stores (i) standardized data and (ii) training data; and
one or more processing devices communicatively coupled to the non-transitory computer-readable medium and the communication interface, the one or more processing devices configured for:
retrieving property records via the plurality of connections,
transforming the property records into the training data having relatively homogeneous segments for an automated modeling algorithm, wherein the one or more processing devices are configured to transform the property records by performing operations comprising:
converting the property records into the standardized data;
identifying a threshold number of completed transactions for each of the relatively homogenous segments;
selecting, from the standardized data, geographic data objects that are associated with a completed transaction value greater than the threshold number;
combining the selected geographic data objects into individual clusters;
combining completed transactions associated with the selected geographic data objects into segments;
performing a similarity analysis on a set of possible pairs of the geographic data objects by comparing numerically valued attributes associated with the geographic data objects, the similarity analysis generating similarity information for the set of possible pairs;
selecting, from the standardized data, remaining completed transactions that are not grouped into segments;
combining, based on the similarity information and the threshold number, the remaining completed transactions into one or more segments such that each completed transaction has been assigned to one or more of the relatively homogeneous segments;
training, with the training data having the relatively homogeneous segments, the automated modeling algorithm to predict an exchange attribute value,
applying the automated modeling algorithm to a target property record identified via communications with the client computing device, wherein applying the automated modeling algorithm to the target property record computes a predicted exchange attribute value for the target property record, and
configuring the communication interface to transmit the predicted exchange attribute value to the client computing device via the data connection.

2. The system of claim 1, wherein converting the property records into the standardized data comprises normalizing the property records into a common database schema.

3. The system of claim 1, wherein performing the similarity analysis comprises:
identifying, for each geographic data object, a respective set of attribute values for a set of multiple attributes, the set of multiple attributes common to the geographic data objects;
creating, for each geographic data object, a respective vector representation having the respective set of attribute values as vector elements; and
determining a respective similarity for each possible pair of geographic data objects based on a distance between a pair of vector representation corresponding to the possible pair of geographic data objects.

4. The system of claim 1, wherein performing the similarity analysis comprises determining a Mahalanobis distance with respect to each possible pair of geographic data objects.

5. The system of claim 1, wherein identifying the threshold number of completed transactions comprises:

performing a first iteration that involves segmenting the standardized data with a first segment size;
applying the first segment size to the automated modeling algorithm;
performing a second iteration that involves segmenting the standardized data with a second segment size that is smaller than the first segment size;
applying the second segment size to the automated modeling algorithm;
determining that a performance of the automated modeling algorithm has degraded between the first iteration and the second iteration; and
selecting the threshold number of completed transactions that causes a segment size of the relatively homogeneous segments to exceed the second segment size.

6. The system of claim 1, the one or more processing devices further configured for:
outputting executable code comprising the automated modeling algorithm, as trained; and
causing the communication interface to transmit the executable code to an additional client computing device for execution at the additional client computing device.

7. A method comprising:
transforming, by a computing system, standardized data from retrieved from multiple data providers into training data having relatively homogeneous segments for an automated modeling algorithm, wherein transforming the standardized data comprises:
identifying a threshold number of completed transactions for each of the relatively homogenous segments,
selecting, from the standardized data, geographic data objects that are associated with a completed transaction value greater than the threshold number,
combining the selected geographic data objects into individual clusters,
combining completed transactions associated with the selected geographic data objects into segments,
performing a similarity analysis on a set of possible pairs of the geographic data objects by comparing numerically valued attributes associated with the geographic data objects, the similarity analysis generating similarity information for the set of possible pairs,
selecting, from the standardized data, remaining completed transactions that are not grouped into segments, and
combining, based on the similarity information and the threshold number, the remaining completed transactions into one or more segments such that each completed transaction has been assigned to one or more of the relatively homogeneous segments;
training, with the training data having the relatively homogeneous segments, the automated modeling algorithm to predict an exchange attribute value;
applying the automated modeling algorithm to a target property record identified via communications with a client computing device over a data connection, wherein applying the automated modeling algorithm to the target property record computes a predicted exchange attribute value for the target property record; and
causing a communication device to transmit the predicted exchange attribute value to the client computing device via the data connection.

8. The method of claim 7, wherein performing the similarity analysis comprises:
identifying, for each geographic data object, a respective set of attribute values for a set of multiple attributes, the set of multiple attributes common to the geographic data objects;
creating, for each geographic data object, a respective vector representation having the respective set of attribute values as vector elements; and
determining a respective similarity for each possible pair of geographic data objects based on a distance between a pair of vector representation corresponding to the possible pair of geographic data objects.

9. The method of claim 7, wherein performing the similarity analysis comprises determining a Mahalanobis distance with respect to each possible pair of geographic data objects.

10. The method of claim 7, wherein identifying the threshold number of completed transactions comprises:
performing a first iteration that involves segmenting the standardized data with a first segment size;
applying the first segment size to the automated modeling algorithm;
performing a second iteration that involves segmenting the standardized data with a second segment size that is smaller than the first segment size;
applying the second segment size to the automated modeling algorithm;
determining that a performance of the automated modeling algorithm has degraded between the first iteration and the second iteration; and
selecting the threshold number of completed transactions that causes a segment size of the relatively homogeneous segments to exceed the second segment size.

11. The method of claim 7, further comprising:
outputting executable code comprising the automated modeling algorithm, as trained; and
causing a communication interface to transmit the executable code to an additional client computing device for execution at the additional client computing device.

12. The method of claim 7, further comprising:
retrieving, by the computing system, property records via a plurality of network connections between the computing system and a plurality of data providers;
converting the property records into the standardized data.

13. The method of claim 12, wherein combining the property records into the standardized data comprises normalizing the property records into a common database schema.

14. The method of claim 13, wherein the automated modeling algorithm outputs the predicted exchange attribute value in one or more of a property valuation, a price index, and a data trend report.

15. A non-transitory computer-readable medium having program code executable by one or more processing devices, wherein the program code, when executed by the one or more processing devices, configures the one or more processing devices to perform operations comprising:
transforming standardized data from retrieved from multiple data providers into training data having relatively homogeneous segments for an automated modeling algorithm, wherein transforming the standardized data comprises:
identifying a threshold number of completed transactions for each of the relatively homogenous segments, selecting, from the standardized data, geographic data objects that are associated with a completed transaction value greater than the threshold number, combining the selected geographic data objects into individual clusters, combining completed transactions associated with the selected geographic data objects into segments, performing a similarity analysis on a set of possible pairs of the geographic data objects by comparing numerically valued attributes associated with the geographic data objects, the similarity analysis generating similarity information for the set of possible pairs, selecting, from the standardized data, remaining completed transactions that are not grouped into segments, and combining, based on the similarity information and the threshold number, the remaining completed transactions into one or more segments such that each completed transaction has been assigned to one or more of the relatively homogeneous segments;

training, with the training data having the relatively homogeneous segments, the automated modeling algorithm to predict an exchange attribute value;

applying the automated modeling algorithm to a target property record identified via communications with a client computing device over a data connection, wherein applying the automated modeling algorithm to the target property record computes a predicted exchange attribute value for the target property record; and causing a communication device to transmit the predicted exchange attribute value to the client computing device via the data connection.

16. The non-transitory computer-readable medium of claim 15, wherein performing the similarity analysis comprises:

identifying, for each geographic data object, a respective set of attribute values for a set of multiple attributes, the set of multiple attributes common to the geographic data objects;

creating, for each geographic data object, a respective vector representation having the respective set of attribute values as vector elements; and determining a respective similarity for each possible pair of geographic data objects based on a distance between a pair of vector representation corresponding to the possible pair of geographic data objects.

17. The non-transitory computer-readable medium of claim 15, wherein identifying the threshold number of completed transactions comprises:

performing a first iteration that involves segmenting the standardized data with a first segment size;

applying the first segment size to the automated modeling algorithm;

performing a second iteration that involves segmenting the standardized data with a second segment size that is smaller than the first segment size;

applying the second segment size to the automated modeling algorithm;

determining that a performance of the automated modeling algorithm has degraded between the first iteration and the second iteration; and selecting the threshold number of completed transactions that causes a segment size of the relatively homogeneous segments to exceed the second segment size.

18. The non-transitory computer-readable medium of claim 15, further comprising:

outputting executable code comprising the automated modeling algorithm, as trained; and causing a communication interface to transmit the executable code to an additional client computing device for execution at the additional client computing device.

19. The non-transitory computer-readable medium of claim 15, the operations further comprising:

retrieving property records via a plurality of network connections to a plurality of data providers;

converting the property records into the standardized data.

20. The non-transitory computer-readable medium of claim 19, wherein combining the property records into the standardized data comprises normalizing the property records into a common database schema.

* * * * *